US008570376B1

(12) United States Patent
Sharma et al.

(10) Patent No.: US 8,570,376 B1
(45) Date of Patent: Oct. 29, 2013

(54) METHOD AND SYSTEM FOR EFFICIENT SAMPLING OF VIDEOS USING SPATIOTEMPORAL CONSTRAINTS FOR STATISTICAL BEHAVIOR ANALYSIS

(75) Inventors: Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1205 days.

(21) Appl. No.: 12/313,359

(22) Filed: Nov. 19, 2008

(51) Int. Cl.
*H04N 7/18* (2006.01)
*G06K 9/00* (2006.01)

(52) U.S. Cl.
USPC .......................................... 348/159; 382/103

(58) Field of Classification Search
USPC .................................. 348/143, 159; 382/103
See application file for complete search history.

(56) References Cited

U.S. PATENT DOCUMENTS

| 5,331,544 | A  | * | 7/1994 | Lu et al. ........................ 705/7.29 |
| 2006/0010028 | A1 | * | 1/2006 | Sorensen ......................... 705/10 |
| 2006/0010030 | A1 | * | 1/2006 | Sorensen ......................... 705/10 |
| 2006/0200378 | A1 | * | 9/2006 | Sorensen ......................... 705/10 |
| 2010/0013931 | A1 | * | 1/2010 | Golan et al. .................... 348/150 |

OTHER PUBLICATIONS

Haritaoglu et al.; "Detection and tracking of shopping groups in stores"; Proceedings of the 2001 IEEE Computer Society Conference on Computer Vision and Pattern Recognition, 2001. CVPR 2001; vol. 1, On pp. I-431-I-438 vol. 1.*
Leykin et al. ("Detecting shopper groups in video sequences"); AVSS '07 Proceedings of the 2007 IEEE Conference on Advanced Video and Signal Based Surveillance; IEEE Computer Society Washington, DC, USA 2007.*

* cited by examiner

*Primary Examiner* — Lynn Feild
*Assistant Examiner* — Lin Liu

(57) ABSTRACT

The present invention is a method and system for selecting and storing videos by applying semantically-meaningful selection criteria to the track sequences of the trips made by people in an area covered by overlapping multiple cameras. The present invention captures video streams of the people in the area by multiple cameras and tracks the people in each of the video streams, producing track sequences in each video stream. The present invention determines a first set of video segments that contains the trip information of the people, and compacts each of the video streams by removing a second set of video segments that do not contain the trip information of the people from each of the video streams. The present invention selects video segments from the first set of video segments based on predefined selection criteria for the statistical behavior analysis. The stored video data is an efficient compact format of video segments that contain the track sequences of the people and selected according to semantically-meaningful and domain-specific selection criteria. The final storage format of the videos is a trip-centered format, which sequences videos from across multiple cameras, and it can be used to facilitate multiple applications dealing with behavior analysis in a specific domain.

20 Claims, 24 Drawing Sheets

METHOD AND SYSTEM FOR EFFICIENT SAMPLING OF VIDEOS USING SPATIOTEMPORAL CONSTRAINTS FOR STATISTICAL BEHAVIOR ANALYSIS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for selecting and storing videos by applying semantically-meaningful selection criteria to the track sequences of the trips made by people in an area covered by overlapping multiple cameras, wherein video segments are selected based on semantically-meaningful and domain-specific selection criteria for the statistical behavior analysis and the size of stored video data is efficiently reduced.

2. Background of the Invention

In prior arts, such as areas for surveillance systems, there have been attempts to manage the stored data in a more intelligent way.

U.S. Pat. No. 5,689,442 of Swanson, et al. (hereinafter Swanson) disclosed a surveillance system that comprises an event sensor, a control processor, and an environment sensor. The event sensor captures images and sounds concerning events for storage, which is managed by a data management functionality. The environment sensor detects event conditions, such as temperature, speed, or motion, in the environment. Using the detected conditions, the control processor determines whether the images and sounds acquired by the sensor comprise an event of interest. A mode control functionality in the control processor processes the sensed conditions to identify the occurrence of events of interest. A data management functionality in the control process manages the stored information by selectively accessing the information and deleting the information that is not wanted to make room in the storage for subsequently captured information.

Although Swanson mentioned the movements as a criterion for identifying events, Swanson is foreign to the idea of using spatiotemporal constraints applied to the track sequences of people for selecting video segments in video streams that facilitate statistical behavior analysis. For example, Swanson mentioned examples of data management scheme in which older frames that are away from the events of interest are deleted from storage. In this approach, the term "time" is used to indicate how old the frames are in the storage, and it is entirely different from the temporal constraints that are applied to the track sequences in the real-world coordinate domain as noted in the present invention.

U.S. Pat. No. 5,969,755 of Courtney (hereinafter Courtney) disclosed a method to provide automatic content-based video indexing from object motion. Moving objects are detected in a video sequence using a motion segmentor. Then, Courtney extracted tracking information from the segmented video. Using tracking information, a motion analyzer analyzes object tracking information and annotates the motion graph with index marks describing eight events of interest, such as appearance/disappearance, deposit/removal, entrance/exit, and motion/rest of objects. Later, when a user gives a query as a form of spatiotemporal event or object-based event, Courtney retrieved the appropriate video clip from the video database.

Courtney is for a content-based video data retrieval system. Courtney noted that clips of the video identified by spatiotemporal queries, along with event and object-based queries are recalled to view the desired video. However, Courtney is foreign to the idea of storing video data based on selection criteria, including spatiotemporal constraints, which are applied to the tracking information of people in the video data, removing the video segments that do not contain tracking information from the video data, thus reducing the size of the stored video data. The eight events of interest defined for video indexing in Courtney are clearly different from spatiotemporal constraints and statistical behavior analysis.

U.S. Pat. No. 6,421,080 of Lambert (hereinafter Lambert) disclosed a method for use with a multi-camera surveillance system that provides pre-event recording. A recording system that records images only when particular events occur reduces the amount of video data by only storing images that have a high probability of being of interest. However, this event-triggered system does not begin until after the occurrence of one of the events. This insures that the period of time just preceding the event will never be recorded. Therefore, Lambert stored acquired video data into temporary storage that has a storage capacity large enough to store during the predefined period time. When the triggering event was detected, Lambert tried to associate video data temporally stored with triggered event video data. Lambert noted transactions at the point-of-sale (POS) terminal or automated teller machine (ATM), output signals from motion sensors or security alarms, and a control signal sent by a remote computer system as examples of triggering events.

Lambert disclosed a novel method for storing event-based video data in real-time. Lambert also disclosed a method for managing storage based on the triggering events. However, Lambert is foreign to the idea of analyzing and indexing the object on the video data, whereas in the present invention, a person's trip information is indexed to link to video data, where the trip information is selected based on the application of the spatiotemporal constraints. In other words, Lambert is foreign to the idea of selecting video segments with spatiotemporal trajectory analysis.

U.S. Patent Application Publication No. US 2005/0180603 of Zoghlami, et al. (hereinafter Zoghlami) disclosed a method and system for efficiently searching for events in a video surveillance sequence. Zoghlami tried to detect an object's appearance or disappearance in the presence of illumination changes or occlusion. In order to detect an event, Zoghlami extracted a series of snapshots of the video sequence at regular intervals as a sampling of the video sequence. Then, Zoghlami defined one or more windows-of-interest (WO1) in each snapshot, and measured the similarity in each WO1 in each snapshot. If the similarity exceeded the threshold, the snapshot was regarded as an event, after verifying that the snapshot does not include the occlusion.

Zoghlami is primarily to detect appearance or disappearance of an event based on the similarity measure, and Zoghlami is foreign to the idea of making decisions for events with trajectories of the object in the video data. Furthermore, Zoghlami is foreign to the idea of storing video data with sampling based on the semantics and application of spatiotemporal criteria on the track sequences detected in the video data. Instead, Zoghlami stores whole video data for searching the event.

U.S. Patent Application Publication No. 2007/0282665 of Buehler, et al. (hereinafter Buehler) disclosed a method of video surveillance systems for receiving data from multiple unrelated locations, performing various aggregation, normalization, and/or obfuscation processes on the data, and providing the summarized data to entities that have an interest in the activities at the store. Interesting activities can be determined by a set of rules that contain site-specific components and site-independent components. A site-specific component can specify locations about the sites, floor plan data, and sensor ID data. A site-independent component can specify actions occurring at the sites, objects placed about the sites or people interacting with objects about the site. Buehler further extended the idea of alerting occurrence of events, transmitting rules to local sites via a networking environment, and storing data, such as video surveillance data, the rules, and the results of analyses.

Basically, Buehler is a prior art that disclosed an event-based video surveillance system in retail space. Buehler is foreign to the idea of storing selected video data based on the semantic sampling and application of spatiotemporal criteria on the track sequences of people in the video data. Buehler only suggested a video storage module that stores video surveillance data and a rules/metadata storage module that stores the rules and metadata captured from the video surveillance system, without teaching any reduction of the video data size based on an application of spatiotemporal constraints.

El-Alfy, H., Jacobs, D., and Davis, L. 2007. Multi-scale video cropping. In Proceedings of the 15th international Conference on Multimedia (Augsburg, Germany, Sep. 25-29, 2007). MULTIMEDIA '07. ACM, New York, N.Y., 97-106, (hereinafter El-Alfy) disclosed a method that crops videos to retain the regions of greatest interest, while also cutting from one region of the video to another, to provide coverage of all activities of interest. El-Alfy chose a trajectory that a small sub-window can take through the video, selecting the most important parts of the video for display on a smaller monitor. The most important parts can be extracted by finding maximum motion energy. Then, a cropping window captured a salient object's movement continuously. This cropping window is later collaged with original video data so that the operator can watch not only the object's activities but also the whole video.

El-Alfy is also for helping an operator to detect a salient object in the videos and not related to a video storage system. El-Alfy used a kind of spatial constraint for obtaining a salient object's movement. However, El-Alfy stored not only a cropping window but also whole video data in the storage. In other words, El-Alfy is foreign to the idea of storing the selected video data that satisfy predefined selection criteria, reducing the amount of stored videos in the database.

Girgensohn, A., Kimber, D., Vaughan, J., Yang, T., Shipman, F., Turner, T., Rieffel, E., Wilcox, L., Chen, F., and Dunnigan, T. 2007. DOTS: support for effective video surveillance. In Proceedings of the 15th international Conference on Multimedia (Augsburg, Germany, Sep. 25-29, 2007). MULTIMEDIA '07. ACM, New York, N.Y., 423-432, (hereinafter Girgensohn) disclosed a multi-camera surveillance system called Dynamic Object Tracking System (DOTS) for tracking people of interest. Girgensohn extracted people's trajectories and mapped into 2D or 3D model of background. Then, Girgensohn detected events and indexed them in the database. This event could be reminded later by the operator. Girgensohn also used face recognition for distinguishing tracking objects so that DOTS can later provide each person's tracking and event information. Girgensohn indexed and marked the event for review in a single or multi-camera surveillance system.

Although Girgensohn mentioned a technique that reduces the frame rate or quality of recorded video during less interesting periods, Girgensohn is foreign to the idea of completely removing the video segments that do not contain track sequences and the video segments in which the track sequences do not satisfy the predefined selection criteria, including spatiotemporal constraints, in a specific domain: The present invention proposes a novel approach of storage reduction based on an application of selection criteria, such as spatiotemporal constraints, to the track sequences of people in the real-world physical domain, which is different from compression by reducing the frame rates or quality of video.

Some prior arts for video retrieval systems show approaches for efficiently finding target contents in a database. However, they lack the idea of reducing the size of the stored video data in the database based on the application of spatiotemporal constraints to the track sequences of people that appear in the video data.

Pingali, G., Opalach, A., and Carlbom, I. 2001. Multimedia retrieval through spatio-temporal activity maps. In Proceedings of the Ninth ACM international Conference on Multimedia (Ottawa, Canada, Sep. 30-Oct. 5, 2001). MULTIMEDIA '01, vol. 9. ACM, New York, N.Y., 129-136, (hereinafter Pingali) disclosed a method for interactive media retrieval by combining a spatiotemporal activity map with domain-specific event information. The active map is a visual representation of spatiotemporal activity functions that can be computed from trajectories of an object's motion in an environment. Using the active map, Pingali expected that a user interacts more intuitively with the multimedia database to retrieve the media streams, trajectories, and statistics of trajectories.

Pingali is basically for providing an efficient method for retrieving the target content using the activity maps. Although Pingali is an exemplary approach that tries to provide a solution to identify the relevant content and retrieve them in very large quantities of multimedia data, such as videos captured by multiple video cameras, Pingali is foreign to the storage scheme of compact video streams by removing video segments that do not contain track sequences of people or moving objects from multiple video streams.

Chen, X. and Zhang, C. 2007. Interactive mining and semantic retrieval of videos. In Proceedings of the 8th international Workshop on Multimedia Data Mining: (Associated with the ACM SIGKDD 2007) (San Jose, Calif., Aug. 12-12, 2007). MDM '07. ACM, New York, N.Y., 1-9, (hereinafter Chen) disclosed an interactive framework for semantic surveillance mining and retrieval. Chen extracted content features and the moving trajectories of objects in the video. After that, general user-interested semantic events are modeled. Based on the modeling of events, Chen tried to retrieve semantic events on the video data by analyzing the spatiotemporal trajectory sequences. Retrieval of events is dynamically learned by interacting with the user.

Chen is also foreign to the idea of storing the selected event-based videos after applying spatiotemporal constraints to the track sequences of people in the videos, and Chen is not related to a multi-camera system.

SUMMARY

The present invention is a method and system for selecting and storing videos based on semantically-meaningful and domain-specific selection criteria on track sequences in video segments for statistical behavior analysis. The method is designed in a manner to support "re-mining" of the behaviors by indexing and sampling representative behaviors in the video streams. The intelligent selection of the video segments enables an effective long-term storage of videos from multiple means for capturing images, such as cameras, by reducing the size of stored data and storing only semantically-meaningful data. The present invention can be utilized for helping in the domain of in-store market research or similar domains involving statistical analysis of human behavior.

Exemplary sampling techniques on the video segments that contain track sequences are proposed to achieve the storage savings in exemplary embodiments. Sampling criteria can be made very domain-specific with the actual sampling being carried out in a different relevant domain space, such as shopper behavior for different demographics. This is enabled by the pre-processing step that creates a proprietary video storage format.

The present invention samples semantically-meaningful video segments from the compact video streams to produce a semantically-organized and further reduced-size collection of video segments.

In the present invention, the selection rate is a normalized real number value ranging between 0 and 1. For example, the selection rate, expressed as $\alpha$, has a value of 1 for no loss, selecting all of the video segments, and a value of 0 for no selection.

The present invention determines a first set of video segments that contain the trip information of the people, which are called "trip video segments", and a second set of video segments that do not contain the trip information of the people in each of the video streams. The present invention compacts each of the video streams using the first set of video segments, after removing the second set of video segments from each of the video streams as a part of the selection process. After the compaction, the present invention selects the video segments that will be stored in a desired storage based on selection criteria. The selection criteria in a preferred embodiment comprise various spatiotemporal constraints.

The present invention creates a trip-centered format that stores the compacted video streams with the first set of video segments based on the track sequences from the multiple means for capturing images. The present invention utilizes a format that comprises a data structure for associating the first set of video segments with the people based on the information for the trip of the people, including a table of indices, and the format facilitates multiple applications dealing with behavior analysis and provides an efficient storage.

Key processes in the present invention can be summarized as follows:

The present invention captures multiple video streams of the people in an area covered by multiple cameras. Then, it tracks the people in each of the video streams, producing track sequences for each of the people.

Information for the trip of the people is found based on the track sequences. In the present invention, the "trip" is defined as a person's movement across multiple fields of view of multiple means for capturing images from entrance to exit, such as exit through a checkout, in a physical space. The trip information includes, but is not limited to, coordinates for the positions of the people, temporal attributes of the tracks, video stream identification (ID), video segment ID, trip ID, and person ID for each of the people.

A first set of video segments that contains the trip information of the people and a second set of video segments that do not contain the trip information of the people are determined in each of the video streams based on the track sequences. The second set of video segments is removed from each of the video streams, thus reducing the size of the video streams. Finally, the present invention selects video segments from the first set of video segments based on predefined selection criteria for the statistical behavior analysis. The selected video segments are stored in a database.

The sampling of the video segments can be based on spatiotemporal constraints for behavior, a rule-based sampling approach, domain-specific sampling criteria, and semantics-based sampling criteria.

In addition, the selected video segments can be analyzed based on demographics. For example, the tracks in the selected video segments can be labeled as to whether each track belongs to a female or male and whether it is a long or short track.

The present invention resolves disambiguation among multiple video segments in the first set of video segments if the people are visible in more than one video segment in the first set of video segments during the same window of time. This helps to prevent from storing unnecessary duplicates for the same track segments during the same window of time.

DRAWINGS

Figures

DETAILED DESCRIPTION OF THE INVENTION

Figure 1:
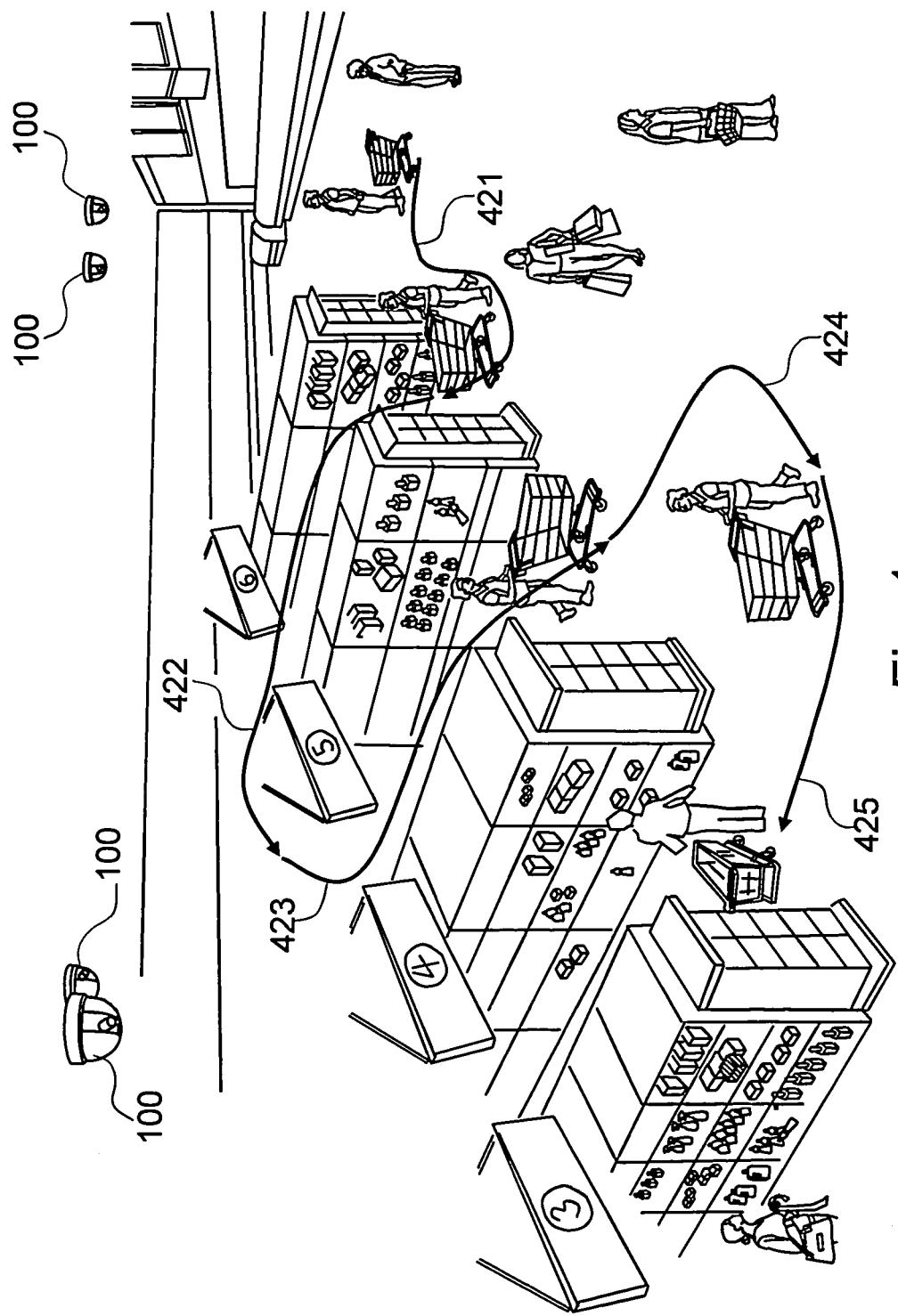
FIG. 1 shows an exemplary application of the preferred embodiment of the present invention in an area.

FIG. 1 shows an exemplary application of the preferred embodiment of the present invention in an area.

The present invention is a method and system for selecting and storing videos based on semantically-meaningful and domain-specific selection criteria on track sequences of people in video segments for the statistical behavior analysis. In the exemplary application shown in FIG. 1, the present invention tracks a person in a physical space, using multiple means for capturing images 100, such as cameras. The track segments, e.g., 421-425, are detected in the video segments of the video streams captured by the multiple cameras.

The selection criteria can comprise one or more spatiotemporal constraints. Examples of the spatiotemporal constraints will be discussed later. In the description of the present invention, the spatiotemporal constraint implies spatial constraint, temporal constraint, or spatiotemporal constraint.

The method is designed in a manner to support "re-mining" of the behaviors by indexing and sampling representative behaviors in the video streams. The intelligent selection of the video segments enables an effective long-term storage of videos from multiple cameras by reducing the size of stored data and storing only semantically-meaningful data. The present invention can be utilized for helping in the domain of in-store market research or similar domains involving statistical analysis of human behavior.

Exemplary sampling techniques on the video segments that contain track sequences are proposed to achieve the storage savings in exemplary embodiments. Sampling criteria can be made very domain-specific with the actual sampling being carried out in a different relevant domain space, such as shopper behavior for different demographics. This is enabled by the pre-processing step that creates a proprietary video storage format, called "VIDEORE" (in U.S. Pat. No. 8,457, 466, Sharma, et al., hereinafter Sharma U.S. Pat. No. 8,457, 466). Then, the present invention samples semantically-meaningful video segments from the compact video streams in VIDEORE to produce a semantically-organized and further reduced-size collection of video segments. The final output of the selected video segments is called "CORE". CORE is not only a format of the stored final output, but also a system and method for storing the selected video segments. The selection of most relevant trips that allows the most effective behavior statistics is made in the CORE, while requiring the least video storage space.

In the present invention, the selection rate is a normalized real number value ranging between 0 and 1. For example, the selection rate, expressed as $\alpha$, has a value of 1 for no loss, selecting all of the video segments, and a value of 0 for no selection.

For example, if a goal of the behavior analysis is to know how many women shopped a predefined target product during a predefined window of time, the user of an embodiment of the present invention does not need all of the detected tracks, e.g., 100 k tracks, from the entire video streams. The user can select only ($\alpha \times 100K$) tracks that appear during the predefined window of time, where $\alpha$ is a temporal constraint in this exemplary case. Therefore, the size of sampled video data depends on the level of the spatiotemporal constraints.

The present invention determines a first set of video segments that contains the trip information of the people, which are called "trip video segments", and a second set of video segments that do not contain the trip information of the people in each of the video streams.

The present invention compacts each of the video streams using the first set of video segments, after removing the second set of video segments from each of the video streams as a part of the selection process. After the compaction, the present invention selects the target video segments based on selection criteria. The exemplary selection criteria in a preferred embodiment comprise various spatiotemporal constraints.

Similar to the VIDEORE, the CORE creates a trip-centered format that stores the compacted video streams with the first set of video segments based on the track sequences from the multiple means for capturing images. The present invention utilizes a format that comprises a data structure for associating the first set of video segments with the people based on the information for the trip of the people, including a table of indices, and the format facilitates multiple applications dealing with behavior analysis and provides an efficient storage. As a matter of fact, VIDEORE can be regarded as one instance of the CORE, in which the selection process selects all of the video segments from the compact video stream, thus making the selection rate set to the maximum.

Key processes in the present invention are as follows:

The present invention captures multiple video streams of the people in an area covered by multiple cameras. Then, it tracks the people in each of the video streams, producing track sequences for each of the people.

Information for the trip of the people is found based on the track sequences. In the present invention, the "trip" is defined as a person's movement across multiple fields of view of multiple means for capturing images from entrance to exit, such as exit through a checkout, in a physical space. The trip information includes, but is not limited to, coordinates for the positions of the people, temporal attributes of the tracks, video stream identification (ID), video segment ID, trip ID, and person ID for each of the people.

A first set of video segments that contains the trip information of the people and a second set of video segments that does not contain the trip information of the people are determined in each of the video streams based on the track sequences. The second set of video segments is removed from each of the video streams, thus reducing the size of the video streams. Finally, the present invention selects video segments from the first set of video segments based on predefined selection criteria for the statistical behavior analysis. The selected video segments are stored in a database.

The sampling of the video segments can be based on
spatiotemporal constraints for behavior,
rule-based sampling approach,
domain-specific sampling criteria, and
semantics-based sampling criteria.

The rule-based sampling approach can comprise a rule application module. The rule application module can comprise information unit verification technologies. The rule can be a composite rule from multiple sub-rules in order to create more complicate selection criteria.

When applying the domain-specific sampling criteria, the actual sampling is carried out in the domain space. Therefore, the selection is performed in the domain space, not in the video space.

For the semantics-based sampling criteria, the semantics are formulated for behavior analysis in the video segments. The application of semantics facilitates intelligent sequencing of the video segments.

As a matter of fact, the spatiotemporal constraints can also be defined according to the rule-based sampling approach, domain-specific sampling criteria, and/or semantics-based sampling criteria.

In addition, the selected video segments can be analyzed based on demographics. For example, the tracks in the selected video segments can be labeled as to whether each track belongs to a female or male, and whether it is a long or short track.

The following example shows a video shrinkage and a shrunk percentage of time in an exemplary set up for an embodiment of the present invention.

In this particular example, let us assume 10 cameras are installed in a physical space, where the cameras capture the video data of people who visit the area 24 hours per day everyday. Then, the amount of accumulated video data will reach approximately 8,760 hours (=24*365) of video data for a typical year. Assuming there were 10,000 people who appeared in the video data with the average trip time of 2 to 5 minutes for an area, the total trip time (without the consideration of the overlaps in the same window of time) will be approximately 333 to 833 hours (20,000 to 50,000 minutes) of video data. Since the CORE only selects the video data that have track sequences and meet the selection criteria, such as spatiotemporal criteria, the amount of video data that are actually selected and stored by the present invention is bounded by the upper limit of 333 to 833 hours of video data, which is only 3.8% to 9.5% of the original raw video data, in this example.

The present invention resolves disambiguation among multiple video segments in the first set of video segments if the people are visible in more than one video segment in the first set of video segments during the same window of time. This helps to prevent from storing unnecessary duplicates for the same track segments during the same window of time.

Figure 2:
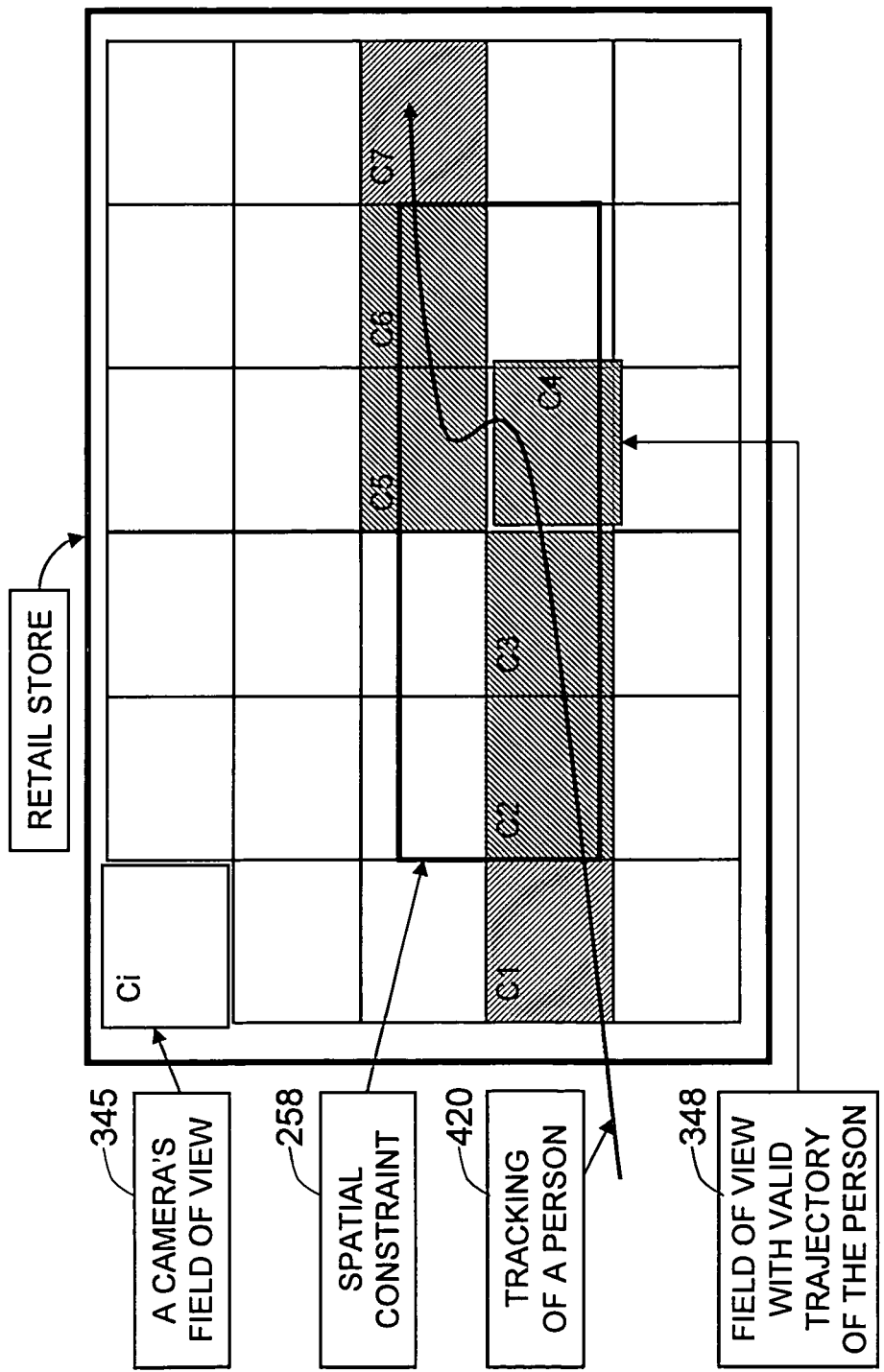
FIG. 2 shows an illustration of an exemplary spatial constraint in a retail space.

FIG. 2 shows an illustration of an exemplary spatial constraint in a retail space.

Each rectangle represents fields of view from multiple cameras that are installed in a physical space, and the bold rectangle, i.e., the region of interest, is an exemplary spatial constraint that can be applied to the physical space.

In practice, the fields of view 345 from multiple cameras are overlapped at their edges and corners if the cameras are installed within certain proximity, but many of the fields of view in FIG. 2 do not show the overlaps for the simplicity of explanation.

In this exemplary case, the spatial constraint 258 can be simply defined as a bounding box where its vertices are mapped to real-world coordinates. At the camera calibration step, the coordinates from the spatial constraint 258 are also mapped to the camera-centered coordinates, i.e., viewer-centered coordinates, and image plane coordinates. A trajectory 420 of a person can be captured in multiple fields of view in the physical space, and only the video segments in video streams from the cameras that satisfy the spatial constraint 258 are selected to be stored as a final output. For example, in FIG. 2, although the person's movement trajectory appears in the fields of view from C1 to C7, only the video segments that contain the track segments from the video streams captured in the fields of view from C2 to C6, e.g., 348, during a specific window of time are selected as valid video segments for the window of time and stored in the video data storage.

Figure 3:
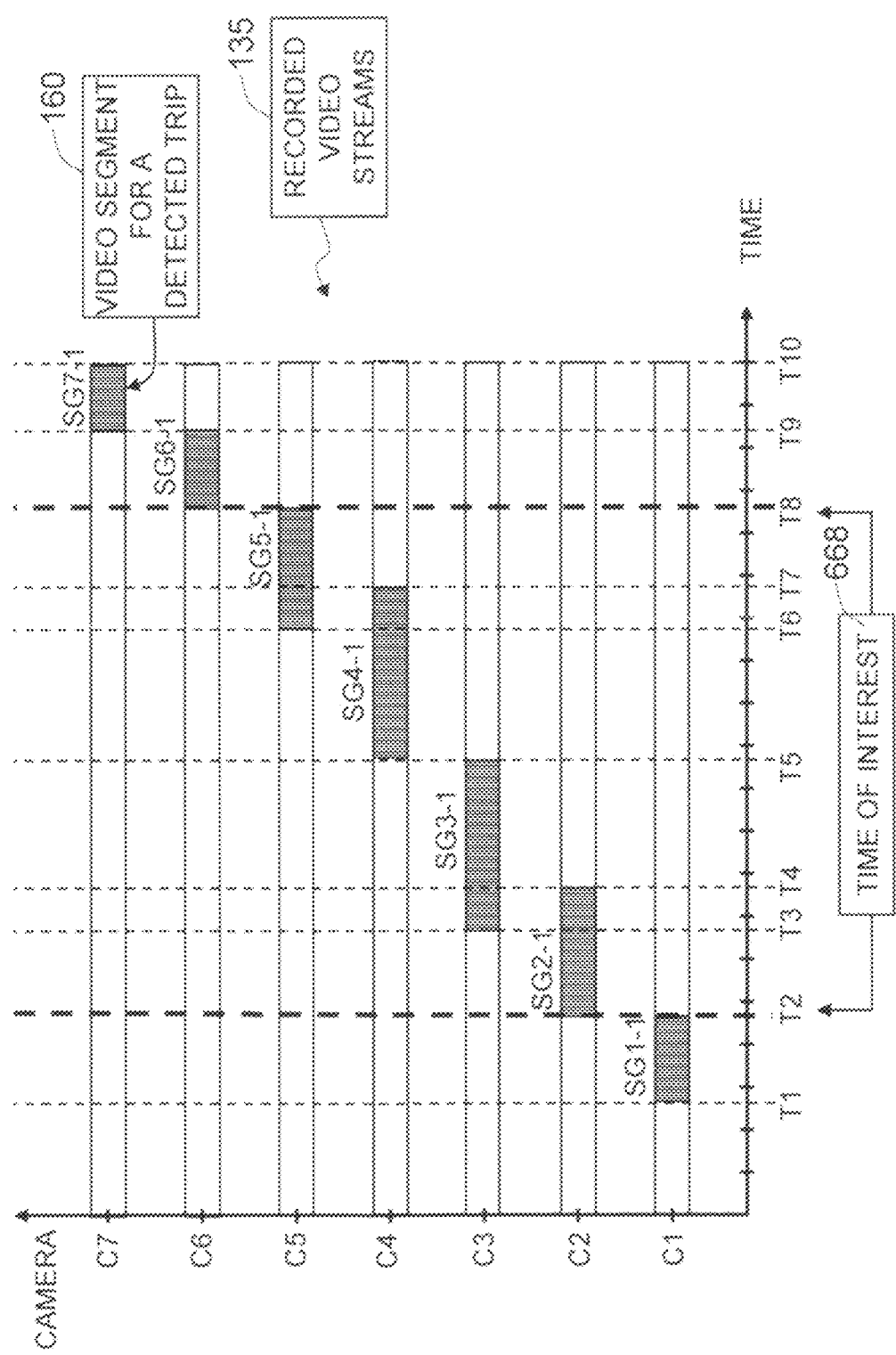
FIG. 3 shows an exemplary temporal constraint that is applied to video segments in multiple video streams from multiple cameras.

FIG. 3 shows an exemplary temporal constraint that is applied to video segments in multiple video streams from multiple cameras.

In this exemplary case, the temporal constraint can be simply defined as a window of time, e.g., a time of interest 668 from "time T2" to "time T8", for a period that is representative for a predefined goal, e.g., a promotional period. Each patterned box represents a video segment in which a person's trip is detected. The patterned video segments can be connected as a sequence if the track sequence in each video segment belongs to the same person. In the exemplary illustration, only a part of the sequence of video segments is valid and stored as a final output among all of the video segments that captured track information of a person's movement, because the specific part only satisfies the temporal constraint. The other video segments in the remaining part of the sequence that do not satisfy the temporal constraint, i.e., do not belong within the duration for the time of interest, are discarded.

Figure 4:
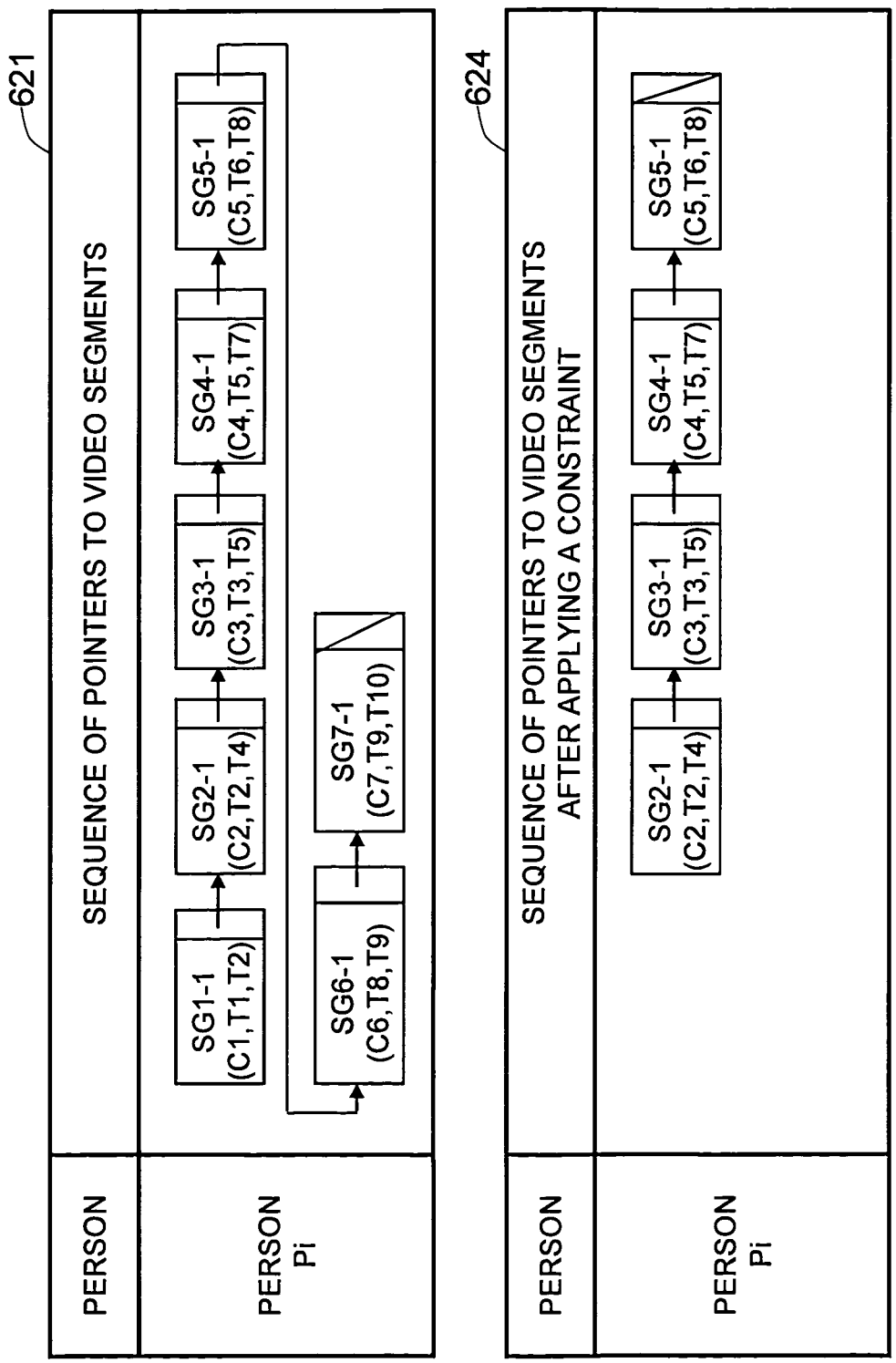
FIG. 4 shows an exemplary sequence of pointers to video segments that track a specific person's movement, and another exemplary sequence of pointers to video segments that satisfy a spatiotemporal constraint.

FIG. 4 shows an exemplary sequence of pointers to video segments that track a specific person's movement, and another exemplary sequence of pointers to video segments that satisfy a spatiotemporal constraint.

The exemplary sequence of pointers to video segments contains only the pointers to the video segments that track a specific person's movement, thus keeping only the video segments that contain the track information of the person and removing the other video segments from the recorded videos.

Further, in the exemplary sequence of pointers to video segments that satisfy a spatiotemporal constraint, the other sequences of pointers to video segments that do not satisfy the spatiotemporal constraint are discarded. For example, in 624 of FIG. 4, the pointers to video segments, SG1-1, SG6-1, and SG7-1, are discarded, after spatial constraints and temporal constraints are applied to the video segments in 621.

The linked list of pointers not only contains the pointers to the relevant video segments, but also the trip attributes data structure in the nodes. The trip attributes data structure can comprise a video stream ID, a compact video stream ID, a video segment ID, a start frame number, a finish frame number, and a plurality of trip measurements, such as person IDs, trip IDs, coordinates of track segments, and timestamps of the track segments. The data element in each node is used in order to refer to the relevant trip video segment in case of creating a collage of the trip video segments, i.e., a logically-organized video, per person.

It needs to be noted that the timestamps of the track segments may be different from the timestamps of the trip video segments. The timestamps of a track segment mark the start and finish of each track segment per person, whereas the timestamps of a trip video segment mark the start and finish of a video segment that contains one or more trip information of people, including the track segments, between the timestamps.

In addition, the timestamps for a "constraint trip video segment" mark the start and finish of a "trip video segment" that satisfy the spatial-temporal constraints that are applied to the "trip video segment".

One of the functionalities of the timestamps becomes useful for creating a collage of video segments per person for various purposes. For example, if the present invention plays back the collage of trip video segments that satisfy a particular spatiotemporal constraint, it utilizes the timestamps of the sequence of "constraint trip video segments" that are stored in the data structure of the nodes.

Figure 5:
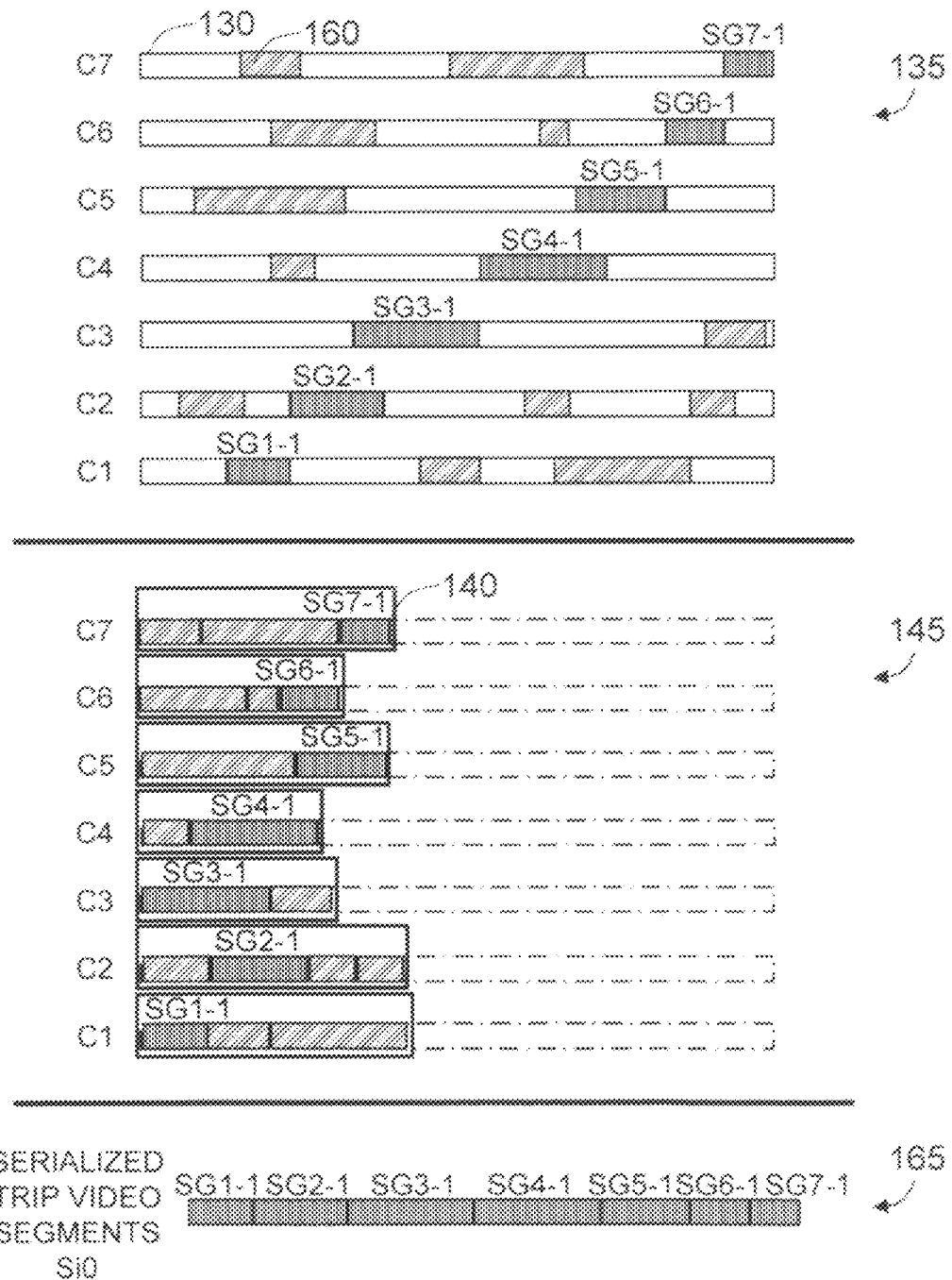
FIG. 5 shows exemplary video streams from multiple cameras and video segments in each video stream, after a compaction process.

FIG. 5 shows exemplary video streams from multiple cameras and video segments in each video stream, after a compaction process.

In each video stream 130 in a plurality of recorded video streams 135 captured by multiple cameras, a video segment 160 for a plurality of detected trips, i.e., a trip video segment, is represented as a patterned rectangle.

In this exemplary case, the present invention detected trips by multiple people in a plurality of video streams, i.e., video streams C1, C2, C3, and Cn, among "n" video streams, where "n" is 7 in this case. The track sequences for the multiple people have been found in a set of trip video segments. Particularly, the exemplary trip video segments "SG1-1", "SG2-1", "SG3-1", "SG4-1", "SG5-1", "SG6-1", and "SG7-1" represent a set of trip video segments that contain track segments of a particular person in this example.

It needs to be noted that there can be overlaps of track segments among the video segments during multiple windows of time. For example, there can be an overlap of track segments that appear in the video segments, "SG2-1" and "SG3-1", during a window of time. There can be a trip video segment that is inclusively overlapped to another trip video segment, also.

The overlaps of the video segments do not necessarily mean the multiple appearances of a person's track sequences in the overlapped video segments. However, if an ambiguity occurs due to multiple appearances of a person's track sequences in multiple video segments, the ambiguity is resolved through a decision-making process.

The trip video segments can be organized in a chronological order, using the "start time" and then the "finish time" in a lookup table. The lookup table for the trip video segments can be created per video stream, so that each table contains the trip video segments of a specific video stream. However, the trip video segments from all video streams during a window of time can also be combined and organized in a chronological order. The video segments in the rows are ordered by "start time" then "finish time," based on a greedy algorithm, in the exemplary lookup table. When the present invention wants to access a particular video segment, the lookup table can provide information for the video stream in which the video segment can be found and the timestamps of the video segment. One use of the table is to facilitate the process of serializing the trip video segments.

An exemplary compact video stream 140 in multiple compact video streams 145 created from the plurality of recorded video streams 135 is composed of the trip video segments for a plurality of detected trips, after a compaction process. The compact video streams contain only the trip video segments, after the video stream compaction process.

Each of the compact video streams has an equal or less data storage size than the original video stream. Regardless of whether one single track is detected or multiple tracks are detected in a trip video segment, each trip video segment is stored only once in a compact video stream. Therefore, the amount of data storage for each of the compact video streams is less than the data storage amount of the original video stream in most cases, and it is equal to the data storage amount of the original video stream in the worst case.

The information for each trip video segment in a compact video stream can be stored in a "trip video segment information data structure" in an exemplary embodiment. A compact video stream ID that is associated with each trip video segment can be added to the "trip video segment information data structure". When the present invention wants to access a particular trip video segment for one or multiple track segments, the "trip video segment information data structure" and the lookup table mentioned earlier can provide information for the compact video stream in which the trip video segment can be found and the timestamps of the trip video segment in the compact video stream. The exemplary serialized trip video segments 165 show one instance of the serialization of the relevant trip video segments for a particular person. The exemplary serialized trip video segments 165 basically find all of the trip video segments that contain track segments of the person of interest and put them together.

Figure 6:
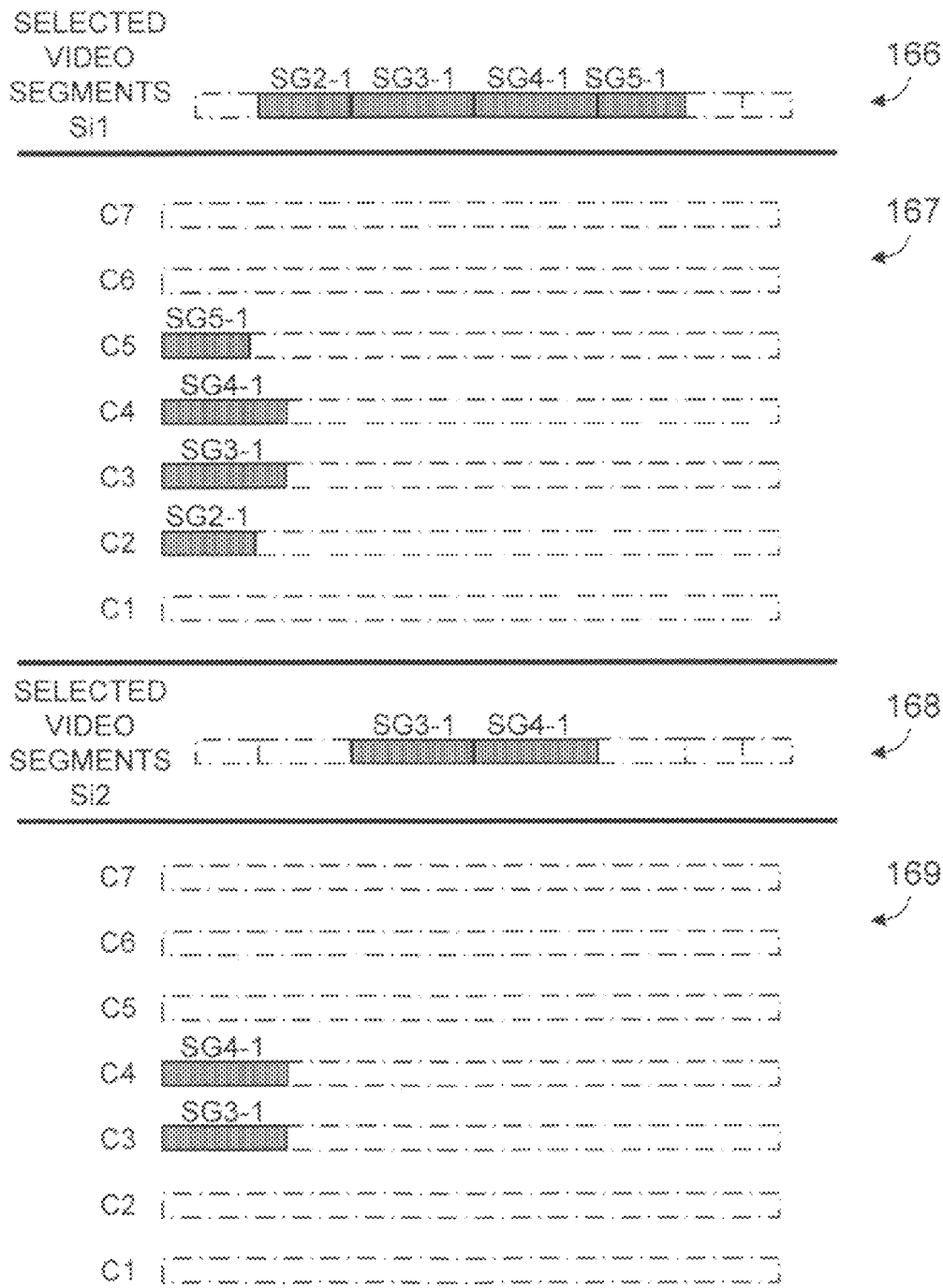
FIG. 6 shows exemplary video segments after a first exemplary selection process and a second exemplary selection process, after applying multi-layer constraints to video segments.

FIG. 6 shows exemplary video segments after a first exemplary selection process and a second exemplary selection process, after applying multi-layer constraints to video segments.

In this exemplary approach, multi-layered constraints are used to select trip video segments for further reduced-size of the selected video data. The spatiotemporal constraint in the first layer can be a primary constraint for filtering the video segments. In the example, the first layer spatiotemporal constraint is applied to exemplary serialized trip video segments, i.e., the "serialized trip video segments" 165, for a person, and selects a subset of the video segments, i.e., "selected trip video segments Si1" 166, which can appear in the video streams as in the exemplary "selected trip video segments Si1 in video streams" 167. The size of the "selected trip video segments Si1 in video streams" 167 is reduced from the size of the exemplary "compact video streams" 145 shown in FIG. 5, because only the trip video segments "SG2-1", "SG3-1", "SG4-1", and "SG5-1" are selected out of all possible trip video segments, i.e., from "SG1-1" to "SG7-1", in the exemplary "serialized trip video segments" 165. After the first layer process, if the result of video sequences satisfies a predefined storage capacity limit or selection rate, these sequences may be stored in permanent data storage.

The second layer can contain a sub-sampling constraint that is used as a secondary constraint of a filtering video segment, especially with regard to the remaining storage capacity. The second stage of sampling is needed if the storage does not have enough room to store the selected videos or to further refine the quality of the selected video segments by applying the next level of spatiotemporal constraints to the previously selected video segments. For example, the next level of spatiotemporal constraints can be applied to the "selected trip video segments Si1" 166, which further selects a subset of the video segments, creating the "selected trip video segments Si2" 168. The second stage of sampling may be called, "statistical subset sampling". In the example, the size of the "selected trip video segments Si2 in video streams" 169 is further reduced from the size of the "selected trip video segments Si1 in video streams" 167 because fewer video segments are selected. In each stage, video segments that do not satisfy the conditions are discarded and the selected video segments are stored within a predefined storage capacity.

Figure 7:
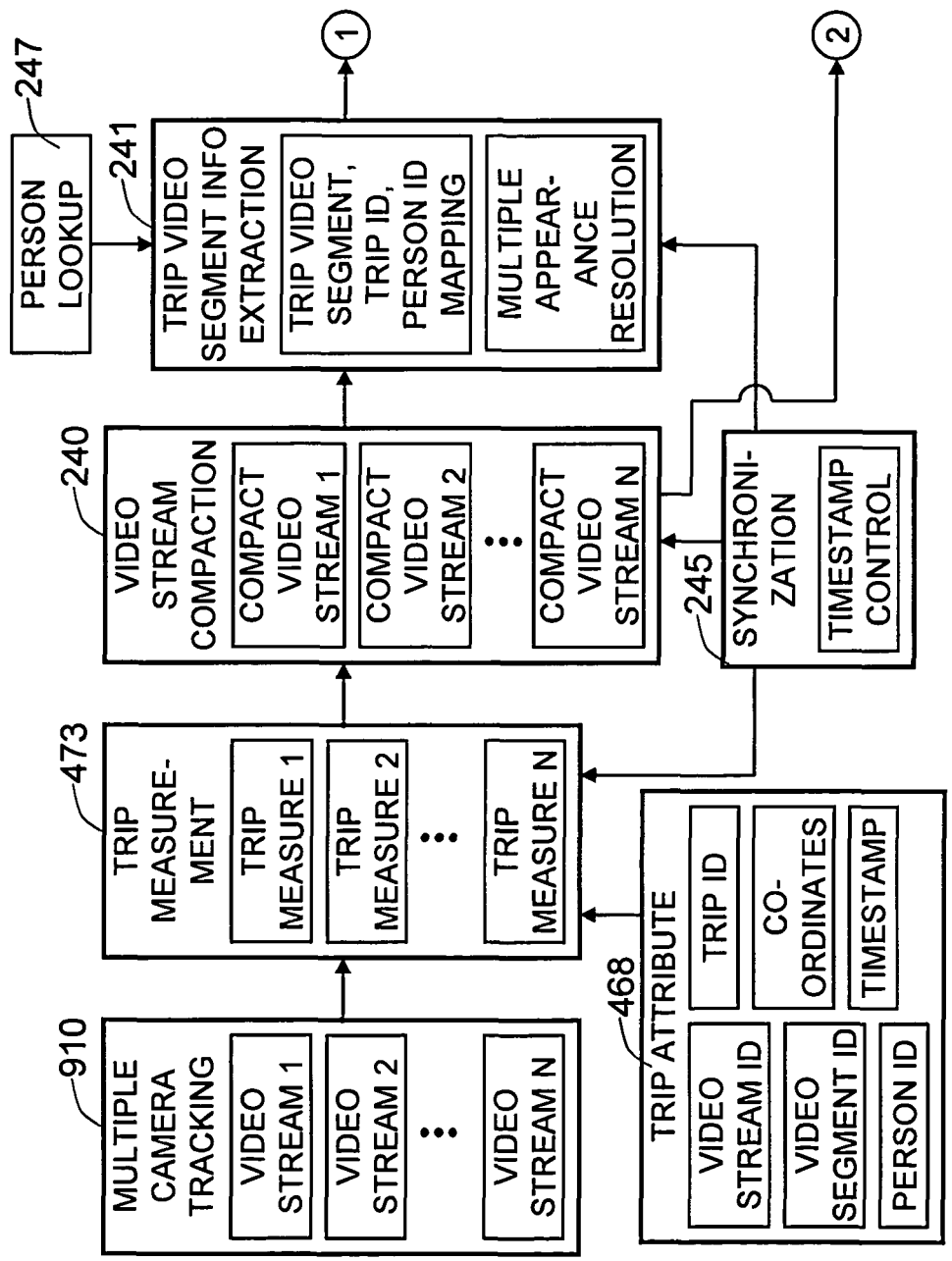
FIG. 7 shows a block diagram for the first part of the components in an exemplary video storage system for sampling video from multiple cameras using spatiotemporal behavior constraints.

FIG. 7 shows a block diagram for the first part of the components in an exemplary video storage system for sampling video from multiple cameras using spatiotemporal behavior constraints.

The present invention utilizes multiple cameras 910 to track the people in an area of interest and captures multiple video streams. The track sequences of the people are augmented with additional information for the trip attributes 468 at the trip measurement 473 stage. Based on the trip information, trip video segments in each video stream are identified, and each of the video streams is divided into two different sets of video segments.

At the compaction 240 process, the present invention utilizes the first set of video segments that contain the trip information of the people, i.e., trip video segments, and a second set of video segments that does not contain the trip information of the people in each of the video streams.

The next process is to compact each of the video streams by removing the second set of video segments that does not contain the trip information of the people from each of the video streams. This process results in compact video streams that are composed of only the first set of video segments, i.e., trip video segments. The compact video streams are sent to the sampling 280 process for the application of selection criteria 990.

Following a person's tracking, a module for trip video segment information 241 extraction detects the relevant sequence of video segments in the compact video streams and maps the person's ID and trip ID along with the video segments. In this process, ambiguities caused by multiple appearances of the person in multiple video segments are also resolved.

Figure 8:
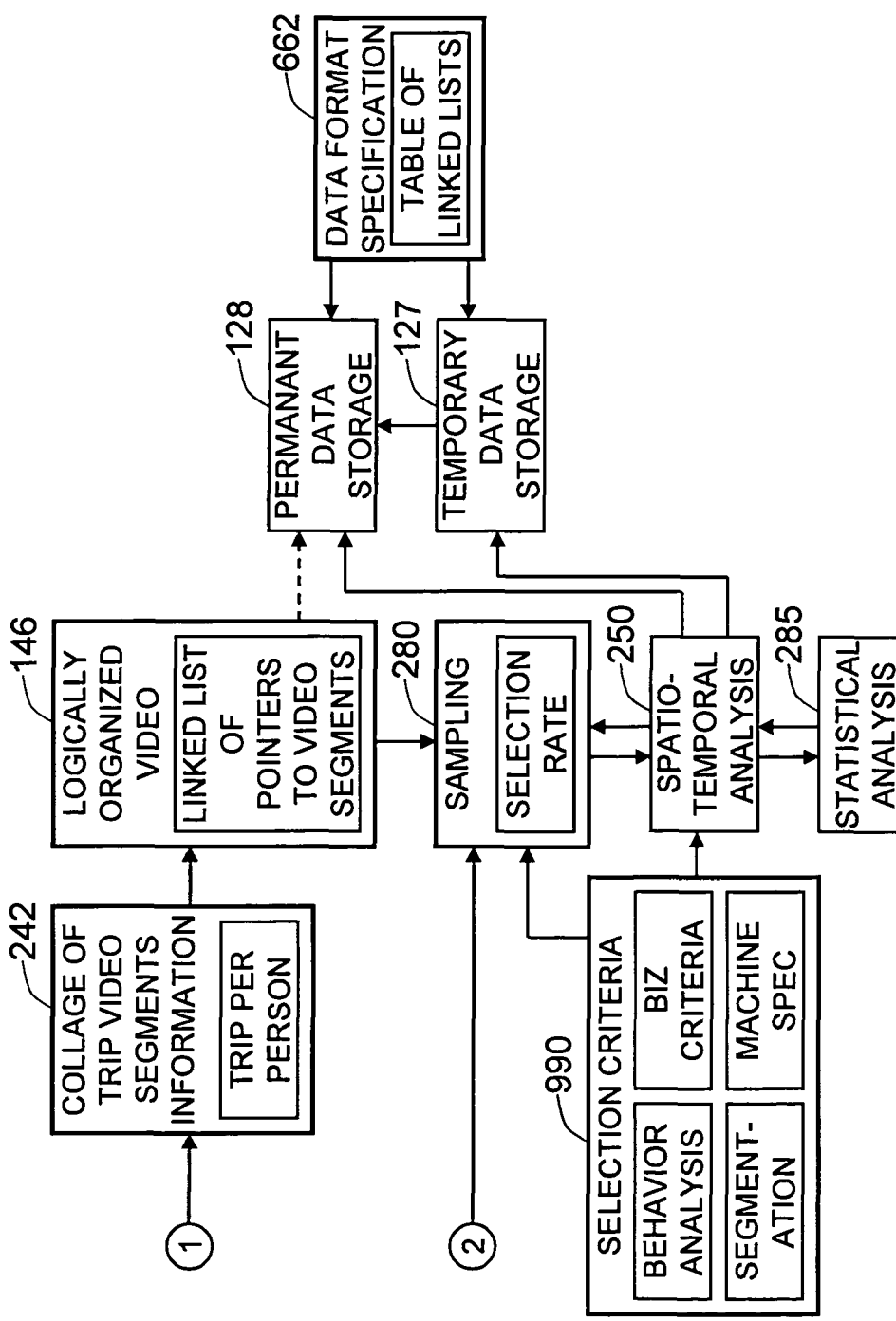
FIG. 8 shows a block diagram for the second part of the components in an exemplary video storage system for sampling video from multiple cameras using spatiotemporal behavior constraints.

FIG. 8 shows a block diagram for the second part of the components in an exemplary video storage system for sampling video from multiple cameras using spatiotemporal behavior constraints.

The present invention applies the predefined selection criteria to the video data from compact video streams or from the logically-organized video streams at the sampling 280 step. The compact video streams already reduced the amount of video data to store in the database. However, the sampling process further reduces the amount of video data according to the target selection rate.

The present invention can create a "collage of video segments information" 242 according to the extracted video segments information per person. The collage of video segments information 242 can essentially create a logically-organized video 146 for the specific person based on the person's trip information, in the sense that the references to the video segments can be logically-organized according to a goal.

The logically-organized video 146 from the collage of video segments information 242 can be either 1) stored in a data storage or 2) sent to the sampling 280 process for the application of selection criteria 990.

The sampling 280 of the video segments from compact video streams or from the logically-organized video streams can be based on selection criteria 990 that comprise spatiotemporal constraints for behavior, rule-based sampling approach, domain-specific sampling criteria, and semantics-based sampling criteria.

Sampling criteria can be made very domain-specific with the actual sampling being carried out in a different relevant domain space, such as shopper behavior for different demographics. The domain-specific sampling criteria can be formulated based on various predefined factors, such as business criteria or machine specification. The present invention samples semantically-meaningful video segments from the compact video streams to produce semantically-organized and further reduced-size collection of video segments.

A spatiotemporal analysis 250 tests whether the sampled video segments meet the predefined spatiotemporal constraints for the selection. A statistical analysis 285 for the sampled data is performed to verify whether the sampled data meets the predefined statistical property. It also calculates and stores information that can be used as the basis for the statistical analysis of human behavior.

The organization of sampled video segments can be formulated in a data structure, such as a linked list of pointers, where the pointers point to the relevant video segments with the targeted trips and track segments in compact video streams. Each of this video information can further be organized according to the specifications of a data format 662. For example, one exemplary data format structure can be a table of linked lists. The stored compact video segments can be retrieved at the later playback process, using the information in the data structure. The entire processes are synchronized 245 with a time server, and timestamps are created for the data. The sampled video segments can be stored in temporary data storage 127 before they are stored in permanent data storage 128, if multiple layers of selection criteria are applied to the sampled video segments or verification steps are enforced to the sampled video segments to adjust the amount of sampled data according to the predefined selection rate.

Figure 9:
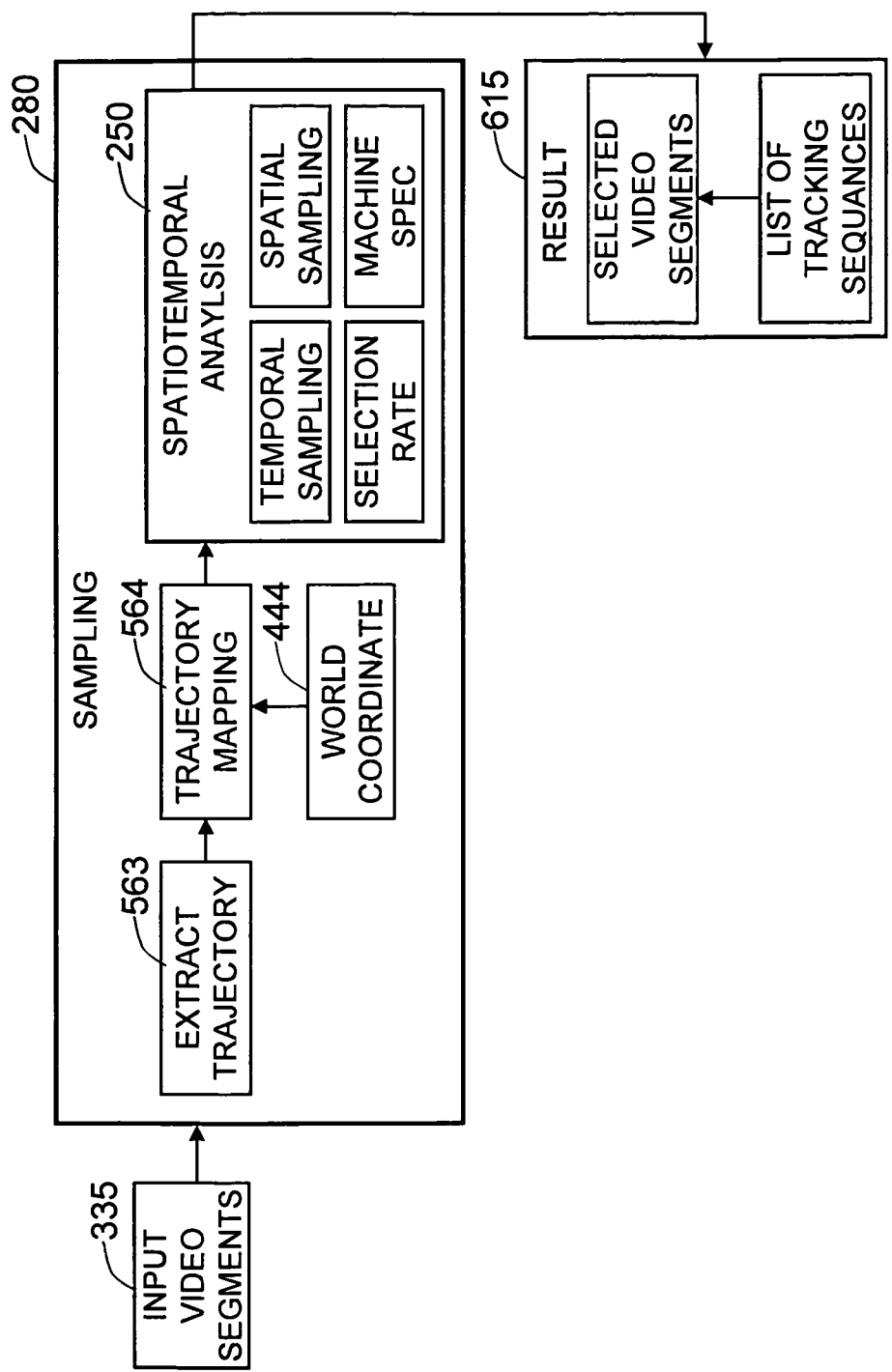
FIG. 9 shows a block diagram of an exemplary statistical sampling used to filter the sequence of pointers to video segments.

FIG. 9 shows a block diagram of an exemplary statistical sampling used to filter the sequence of pointers to video segments.

Using the sequence of pointers to video segments, the present invention can extract 563 the trajectories of track sequences in the target input images 335. The trajectories are mapped 564 into world coordinates 444. The spatiotemporal analysis 250 tests whether the trajectories of the sampled video segments meet the predefined spatiotemporal constraints for statistical sampling. Exemplary statistical sampling methods are discussed from FIG. 10 to FIG. 20. The final result 615 of the selected video segments 155 is a part of original sequence of pointers to video segments, and it is stored in a storage.

FIG. 10 through FIG. 20 shows exemplary statistical sampling methods. Based on the result of applying the constraints in the statistical sampling methods, the video segments that contain the selected trajectories are stored in a data storage.

Figure 10:
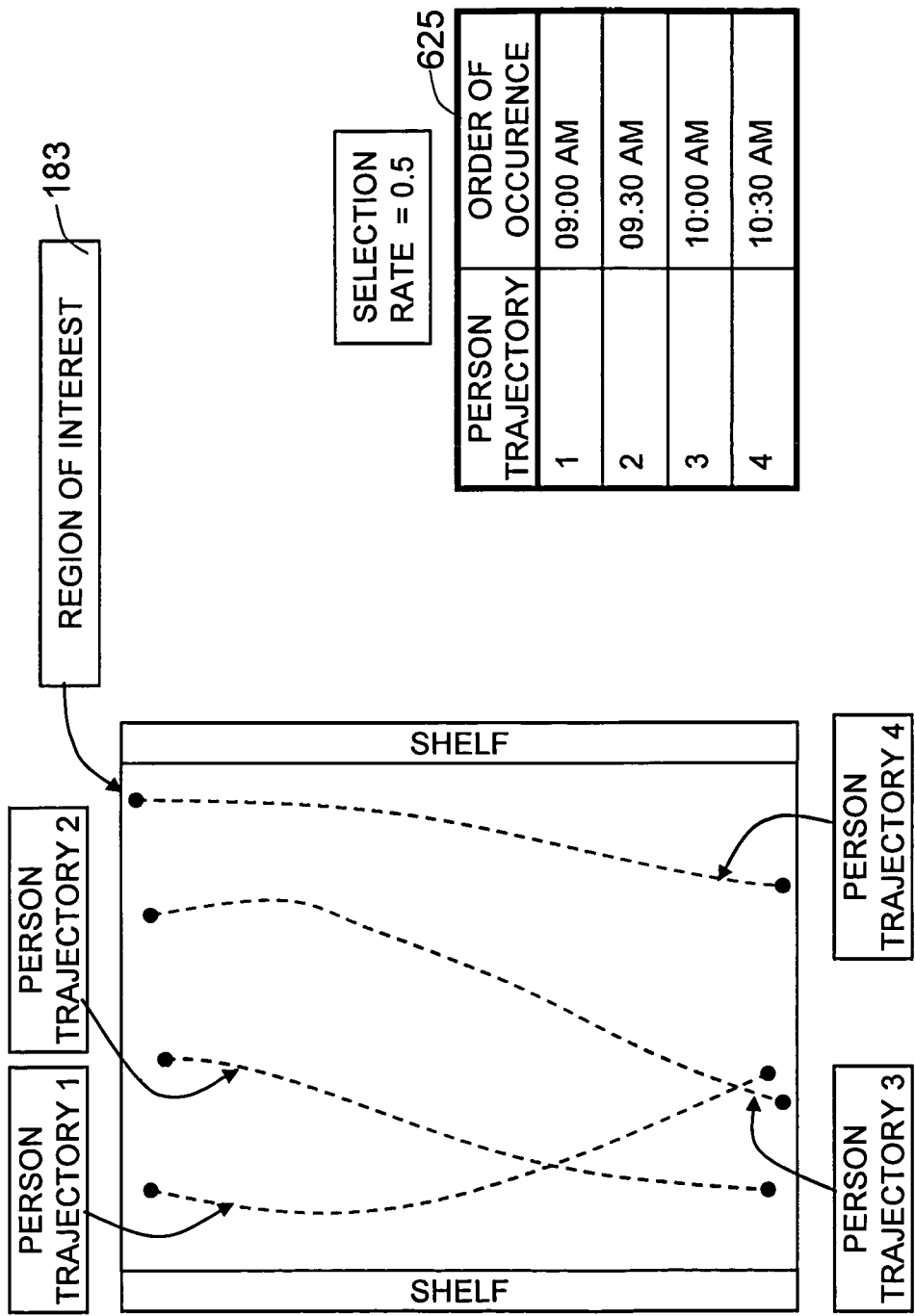
FIG. 10 shows an illustration of an exemplary statistical sampling based on the order of the timed track occurrences.
Figure 11:
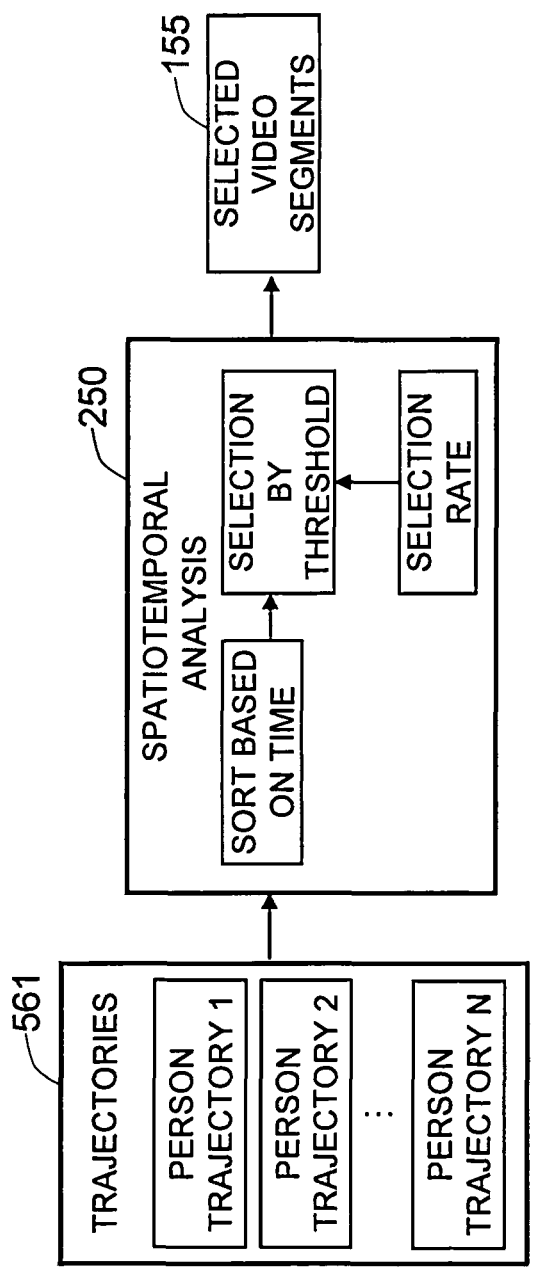
FIG. 11 shows a block diagram of an exemplary embodiment of statistical sampling based on the order of the timed track occurrences.

FIG. 10 shows an illustration of an exemplary statistical sampling based on the order of the timed track occurrences. FIG. 11 shows a block diagram of an exemplary embodiment of statistical sampling based on the order of the timed track occurrences with regard to FIG. 10.

In the example, trajectories 561 of the people in the region of interest 183 are ordered according to the order of occurrence, e.g., "table for trajectories ordered by occurrence" 625. An exemplary temporal constraint can be set to select a subset from the trajectories that satisfy a predefined threshold at the spatiotemporal analysis 250 step. For example, the temporal constraint can be made to select the trajectories that appear before a time threshold, "$Threshold_{ti}$".

The choice of a threshold will be dependent on the selection rate. If the selection rate is undefined, the temporal constraint can be a fixed predefined time threshold. In this case, all of the trajectories that satisfy the time threshold are selected, and the ratio of the selected trajectories will be calculated.

If the selection rate is predefined, the time threshold is adjusted so that the number of selected trajectories is equal to or less than a number that is controlled by the predefined selection rate. For example, if the selection rate is 0.5, only up to half of the trajectories that happened earlier than the other half, among all possible occurrences of trajectories, will be selected. Thus, a time threshold that satisfies the selection rate of 0.5 will be chosen, or alternatively the first 50% trajectories will be selected in the ordered list of trajectories. In the table shown in FIG. 10, the trajectories of person 1 and person 2 will be selected, because they passed the region of interest 183 in an aisle earlier than others, satisfying the selection rate of 0.5 according to this example. Based on the result of applying the constraints in this approach, the video segments that contain the selected trajectories are stored in a data storage.

Figure 12:
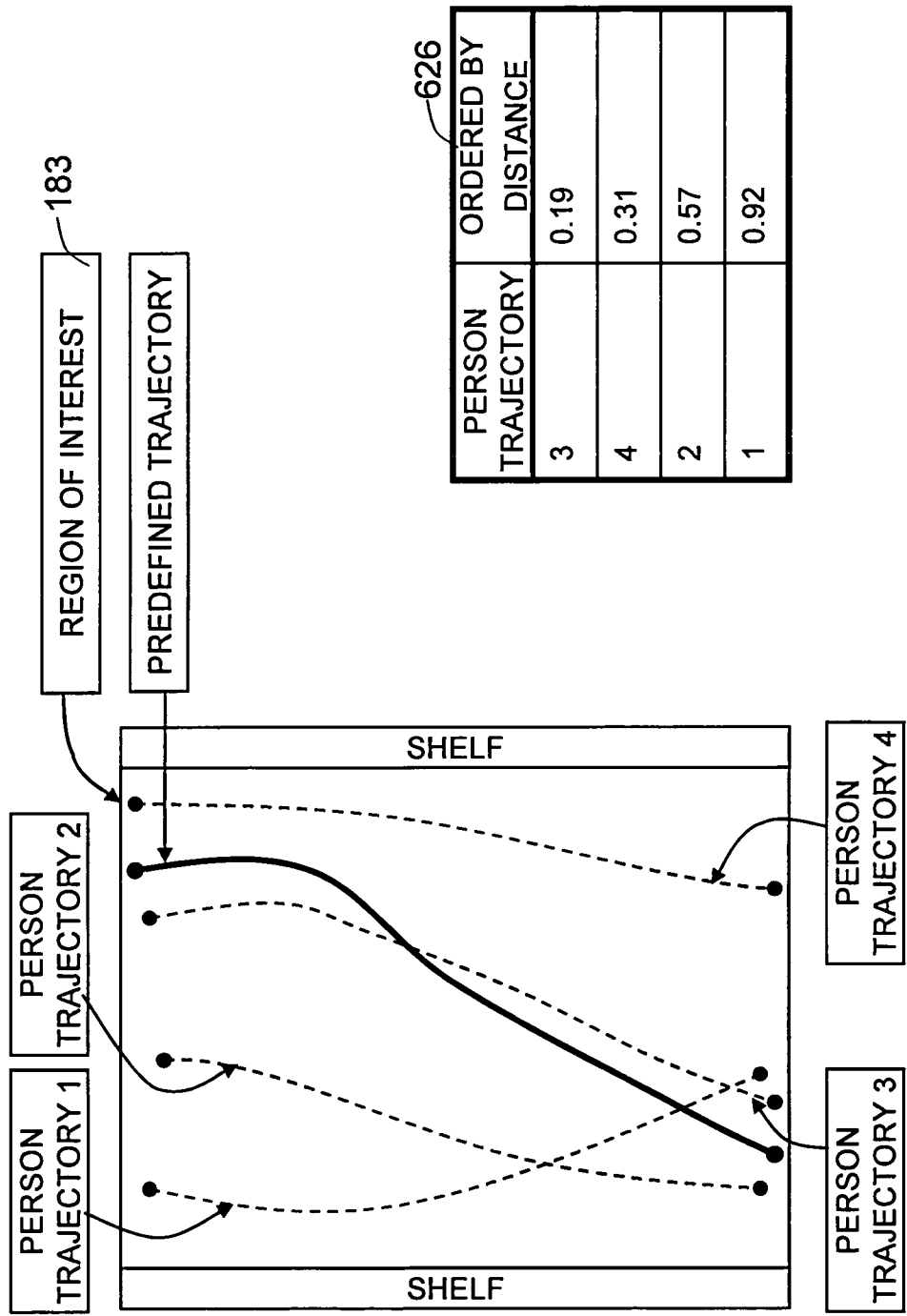
FIG. 12 shows an illustration of another exemplary statistical sampling based on the distance between a standard trajectory and trajectories of people.
Figure 13:
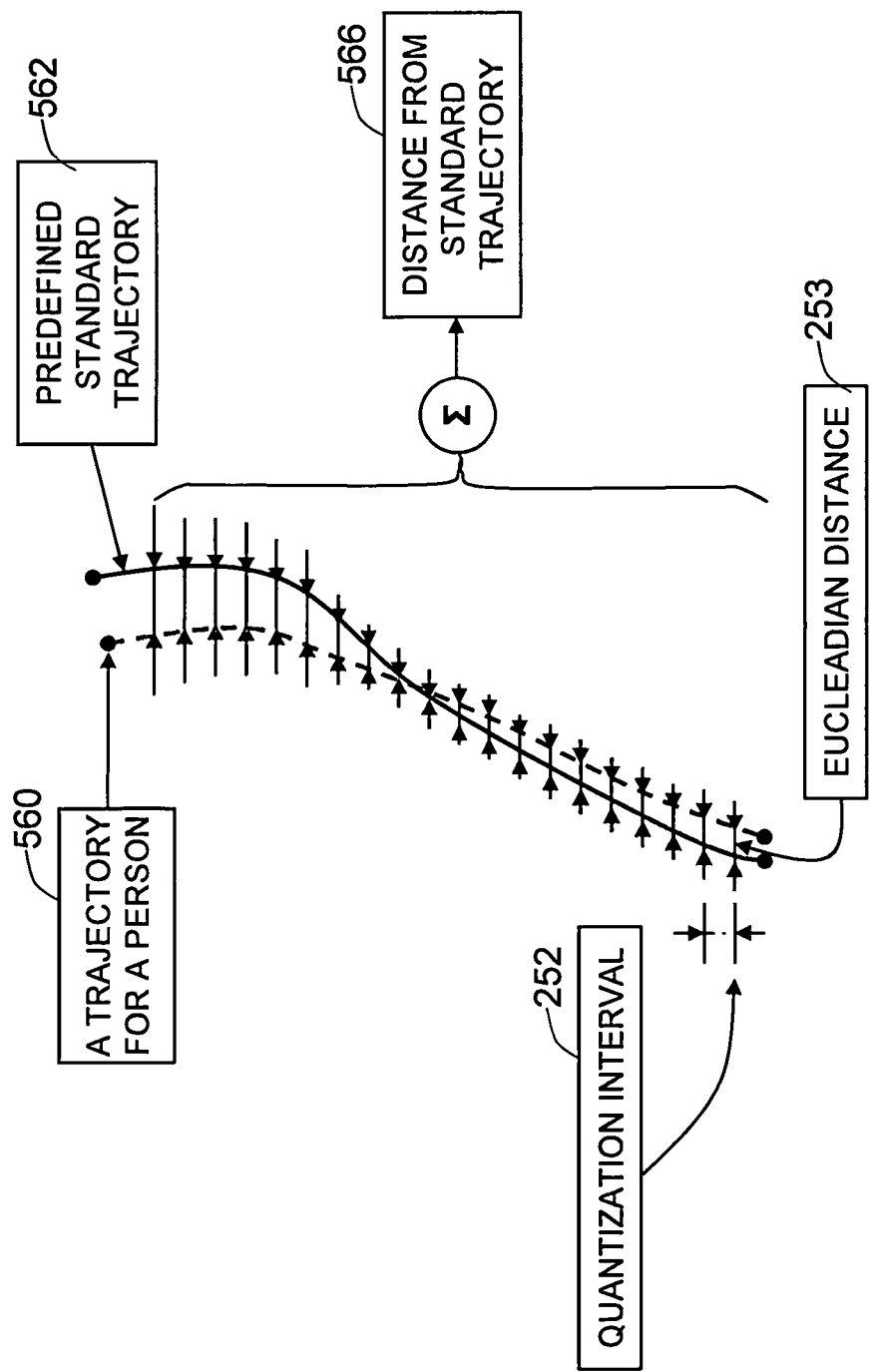
FIG. 13 shows an exemplary measurement of distance between a standard trajectory and a person track trajectory for a distance-based statistical sampling.
Figure 14:
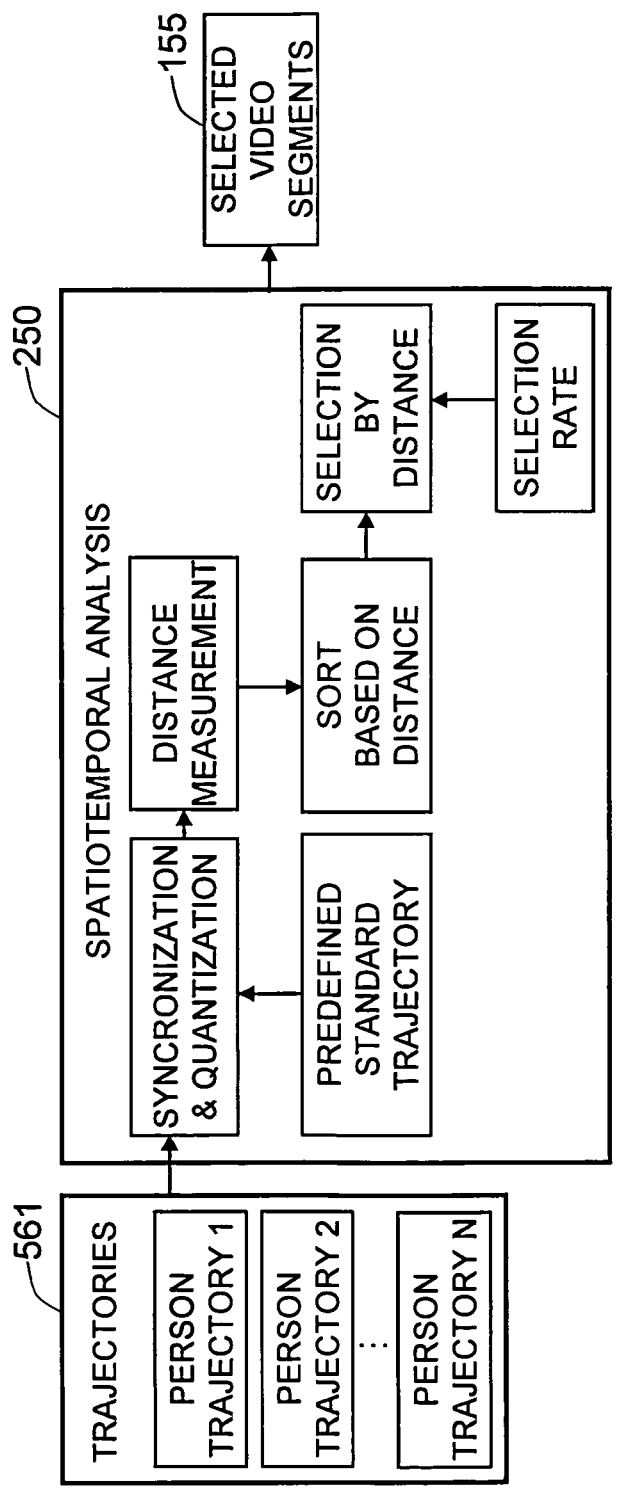
FIG. 14 shows a block diagram of an exemplary embodiment of statistical sampling based on the distance between a standard trajectory and trajectories of people.

FIG. 12 shows an illustration of another exemplary statistical sampling based on the distance between a standard trajectory and trajectories of people. FIG. 13 shows an exemplary measurement of distance between a standard trajectory and a person track trajectory for a distance-based statistical sampling. FIG. 14 shows a block diagram of an exemplary embodiment of statistical sampling based on the distance between a standard trajectory and trajectories of people.

In the example, trajectories 561 of the people in the region of interest 183 are ordered according to the order of distance between a standard trajectory 562 and trajectories of people, e.g., "table for trajectories ordered by distance" 626.

A distance threshold, e.g., "Threshold$_{di}$", which is compared against the distance between the standard trajectory and the trajectories of people is an exemplary spatial constraint. The standard trajectory can be predefined, and it can be a representative trajectory among the people's trajectories or an artificially defined linear or curvilinear line.

A subset of the people's trajectories that satisfy a predefined threshold for the distance can be selected at the spatiotemporal analysis 250 step. For example, the spatial constraint can be made to select the trajectories that have less than or equal to a distance threshold, "Threshold$_{di}$".

The choice of a threshold will be dependent on the selection rate. If the selection rate is undefined, the spatial constraint can be a fixed predefined distance threshold. In this case, all of the trajectories that satisfy the distance threshold are selected, and the ratio of the selected trajectories will be calculated.

For example, if the distance threshold, "Threshold$_{di}$;" is set as follows:

$$\text{Constraint}_{s1}: \text{distance of trajectories} <= 0.80 \quad (1)$$

where "Constraint$_{s1}$" is a spatial constraint, and 0.80 is an exemplary normalized distance value, then the trajectories of person 3, person 4, and person 2 will satisfy the spatial constraint in the example shown in FIG. 12. The selection ratio will be 75%, since three out of four trajectories were selected.

If the selection rate is predefined, the distance threshold is adjusted so that the number of selected trajectories is equal to or less than a number that is controlled by the predefined selection rate.

For example, if the selection rate is 0.5, only up to half of the trajectories that are closer to the standard trajectory than the other half, among all possible occurrences of trajectories, will be selected. Thus, a distance threshold that satisfies the selection rate of 0.5 will be chosen, or alternatively the first 50% trajectories will be selected in the ordered list of trajectories. In the table shown in FIG. 12, a distance threshold, such as "Threshold$_{di}$=0.40", can be chosen, so that the trajectories of person 3 and person 4 are selected, because two out of four trajectories satisfy the selection rate of 0.5.

As shown in FIG. 13, each person's trajectory is quantized at every quantization interval 252, where the size of quantization interval 252 is a predefined constant. The Euclidean distances 253 at the intervals are summed, and the average of the distances can be normalized to a value between 0 and 1. The normalized distance can be regarded as the final distance measure 566 between the person's trajectory and the standard trajectory. The distance measures are calculated for all of the available trajectories in the area of interest during the measurement window of time, and the trajectories are sorted in an increasing order of distance.

Figure 15:
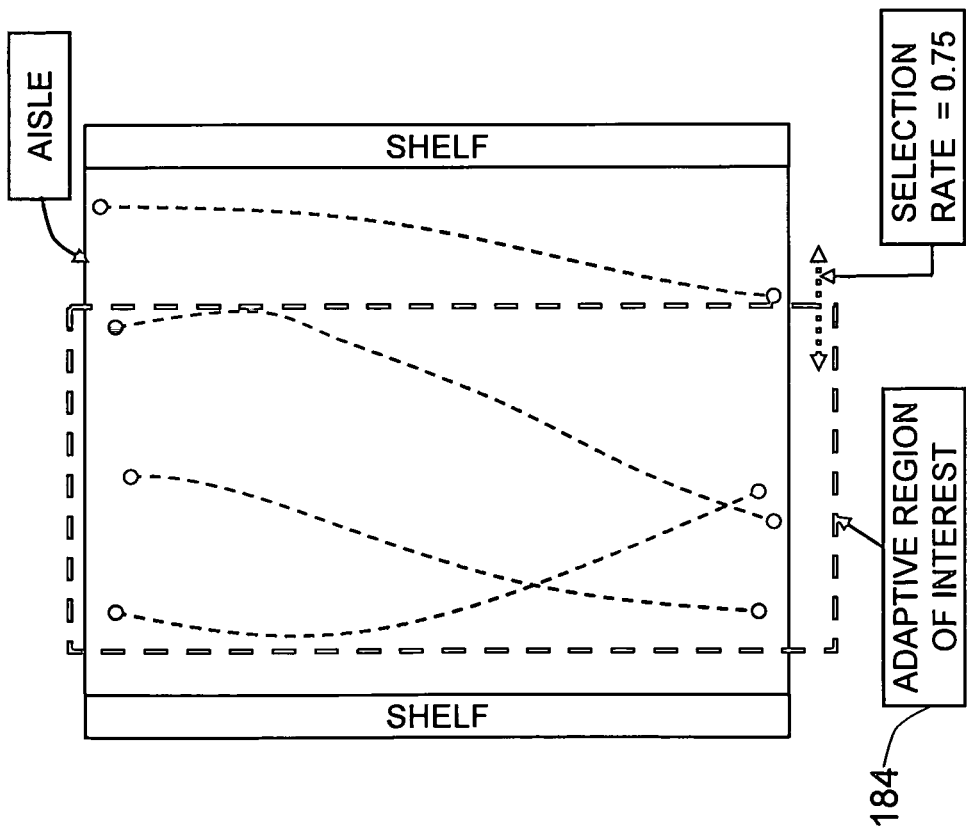
FIG. 15 shows an illustration of an exemplary statistical sampling based on an approach for the adaptive region of interest.
Figure 16:
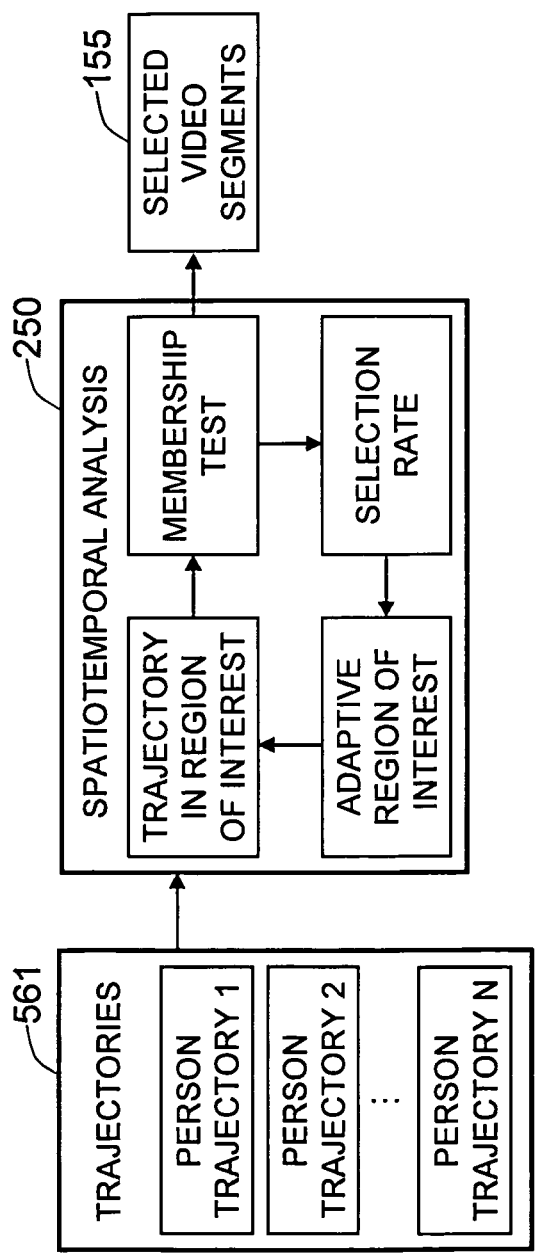
FIG. 16 shows a block diagram of an exemplary embodiment of statistical sampling based on an approach for the adaptive region of interest.

FIG. 15 shows an illustration of an exemplary statistical sampling based on an approach for the adaptive region of interest. FIG. 16 shows a block diagram of an exemplary embodiment of statistical sampling based on an approach for the adaptive region of interest with regard to FIG. 15.

The adaptive region of interest is another exemplary spatial constraint. In the overall area where the video segments are gathered, the region of interest can be defined in such a way that the trajectories are sampled only when the trajectories belong to the adaptive region of interest, satisfying a predefined threshold.

The adaptive region of interest 184 can have various sizes and forms. The adaptive region of interest does not have to be a single contiguous region in the tested area. There can be multiple adaptive regions of interest as the spatial constraint. The adaptive region of interest can be a specific sub-region in the measurement area. The boundaries of the adaptive region of interest define the location, size, and the number of sections.

Whether a trajectory belongs within the adaptive region of interest is determined by a membership test. The membership test simply measures how much of the coordinates of the trajectories falls within the boundaries of the adaptive region of interest. If the portion of coordinates that fall within the boundaries of the adaptive region of interest is greater or equal to a predefined threshold, the trajectory is recognized as a member trajectory that satisfies the spatial constraint.

While the trajectories are selected based on whether the trajectories are included in the adaptive region of interest within a threshold, i.e., based on the membership test, the size of the adaptive region of interest can be changed based on the predefined selection rate. For example, if the selection rate is 0.75 and there are less than 75% of trajectories that are within the adaptive region of interest, the size of the adaptive region of interest can be enlarged to be big enough to cover the 75% of the trajectories that satisfy the spatiotemporal constraint.

Figure 17:
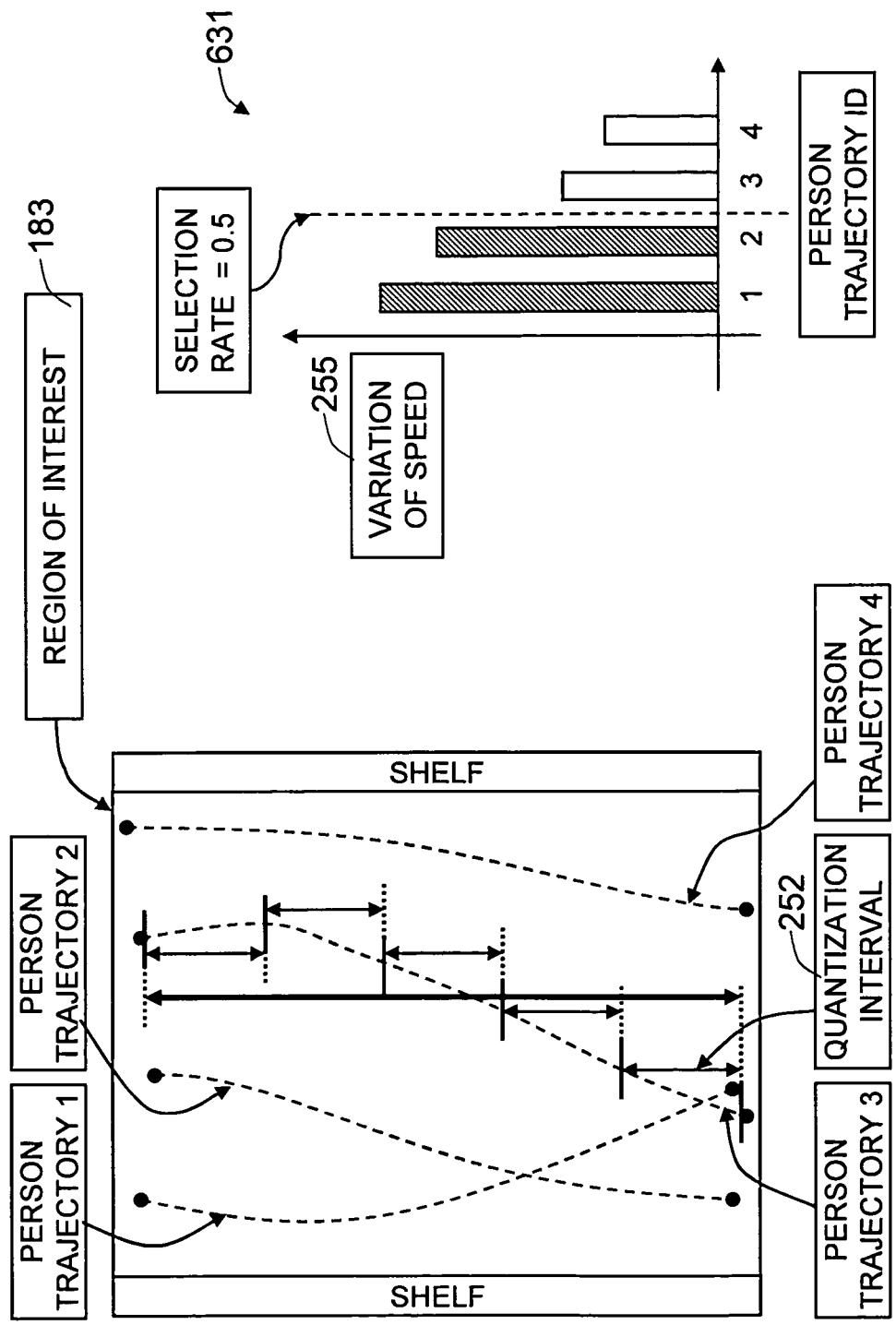
FIG. 17 shows an illustration of an exemplary statistical sampling based on speed variation.
Figure 18:
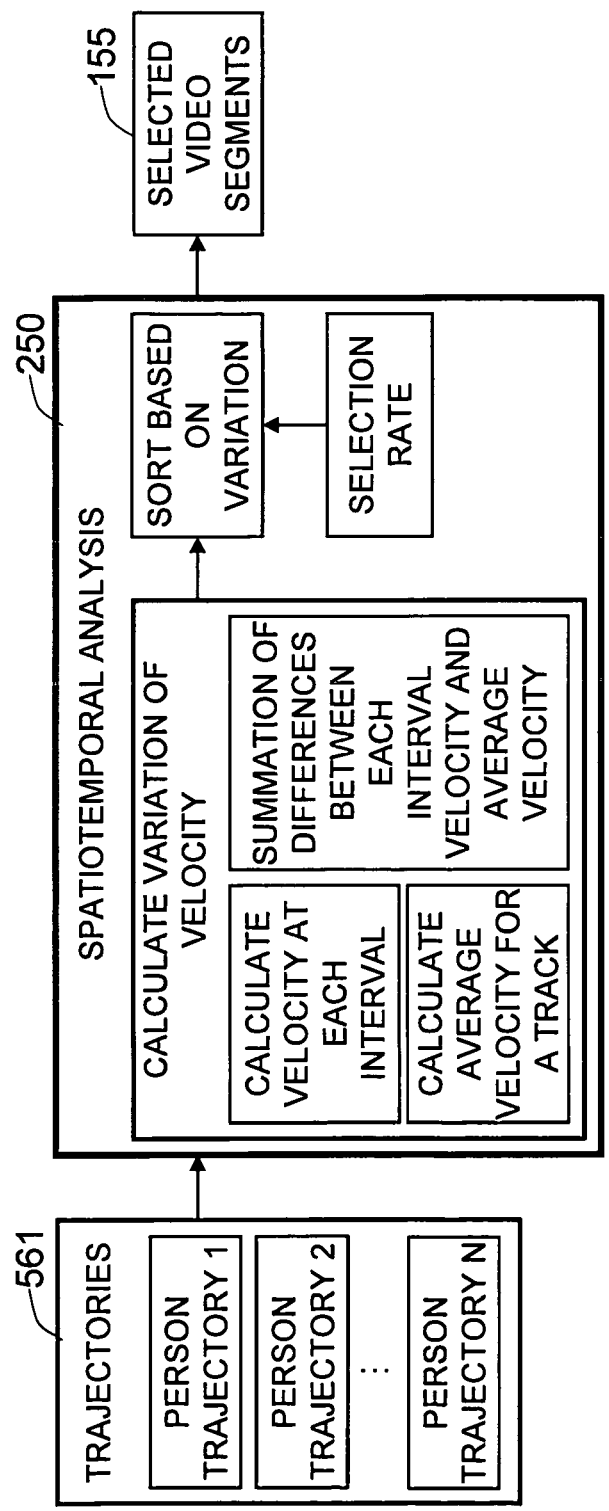
FIG. 18 shows a block diagram of an exemplary embodiment of statistical sampling based on speed variation.

FIG. 17 shows an illustration of an exemplary statistical sampling based on speed variation. FIG. 18 shows a block diagram of an exemplary embodiment of statistical sampling based on speed variation with regard to FIG. 17.

In the exemplary sampling shown in FIG. 17, the overall average speed of each trajectory is calculated using the distance of each trajectory and the amount of time that is spent for the trajectory, i.e., time to travel from the start point to the end point of each trajectory in the region of interest. Each trajectory is divided into multiple equal length quantization intervals. The number of the quantization intervals is predefined and the number is the same throughout all of the measured trajectories. The average speed of each interval is also calculated in each trajectory. The difference between the overall trajectory speed and each interval speed shows an interval variation of the speed in an individual interval for a trajectory. The total variation of the speed for an entire trajectory can be calculated based on the equation below:

$$Var_{id} = \Sigma_{p\_id=1 \text{ to } N}(Speed_{p\_id} - Speed_{avg\_id})^2 \qquad (2)$$

where p_id represents a person's ID. N represents the total number of quantization intervals in each trajectory. $Speed_{p\_id}$ represents the average speed of each quantization interval and $Speed_{avg\_id}$ represents the overall average speed of a trajectory.

A larger speed variation of a trajectory may indicate that there is a higher probability that an interesting event happened during a specific interval in the trajectory with regard to a person's movement. For example, a larger speed variation may indicate that the person in the trajectory reduced the speed of traveling in order to stop in the vicinity of an object that is located in the region of interest. A small speed variation of a trajectory may indicate that the person in the trajectory maintained a monotonous movement, e.g., just passing by the region of interest.

In the example, trajectories 561 of the people in the region of interest 183 are ordered according to the order of variation magnitude, e.g., "graph for trajectories ordered by variation" 626. The trajectories may be sorted in decreasing order of speed variation, and selected based on a threshold and selection rate. For example, the trajectories with the'variation that is larger or equal to a variation threshold can be selected. In another example, if the sampling rate is set as 0.5, only half of trajectories that have larger variation can be selected.

Figure 19:
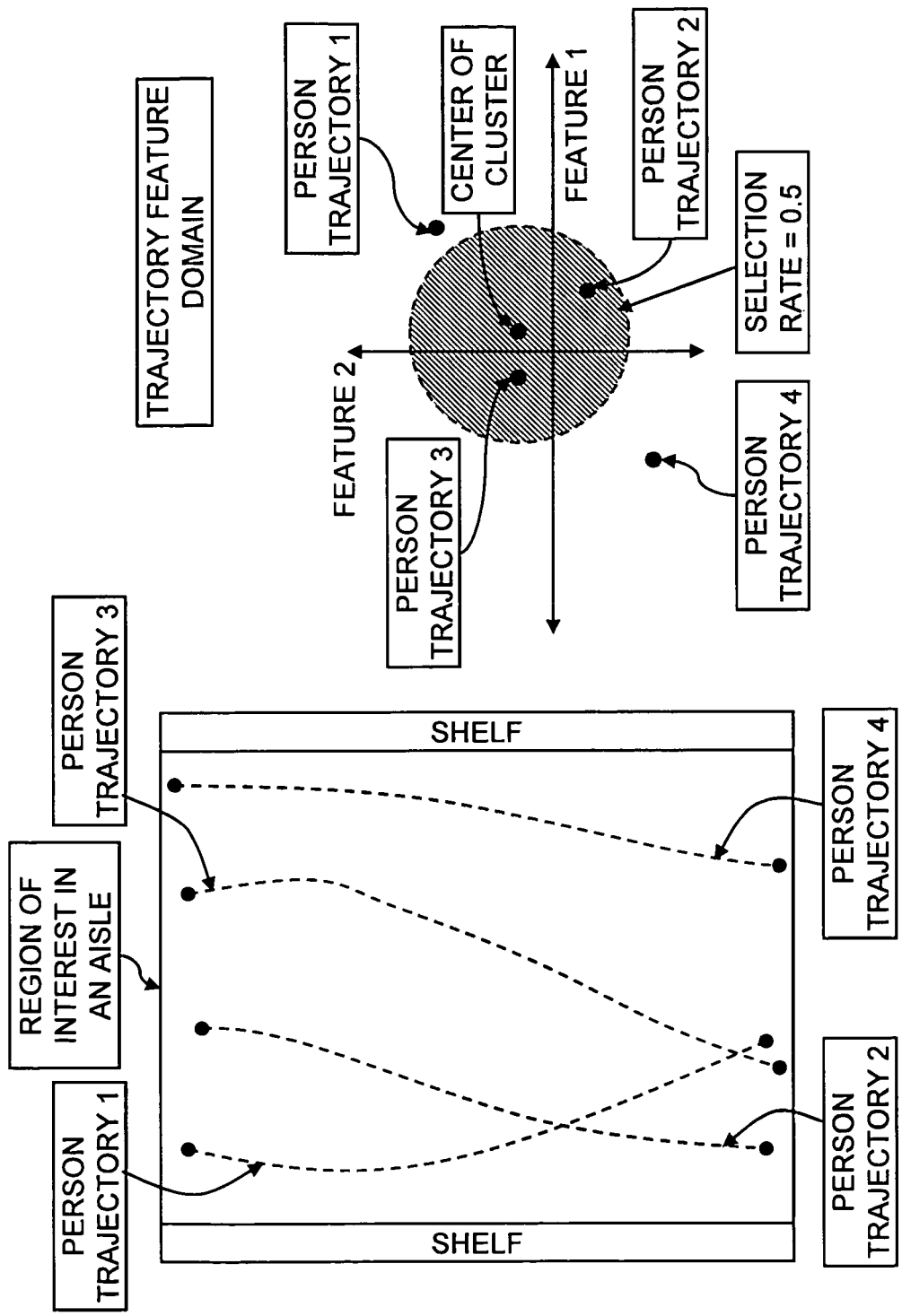
FIG. 19 shows an illustration of an exemplary statistical sampling based on a clustering algorithm.
Figure 20:
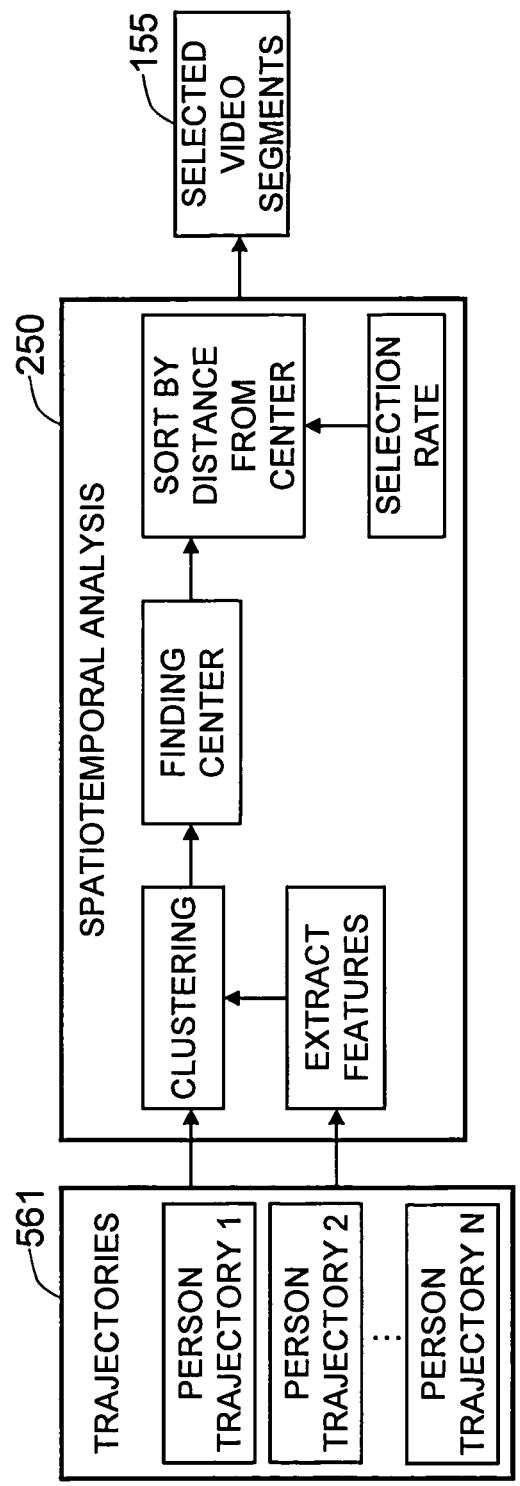
FIG. 20 shows a block diagram of an exemplary embodiment of statistical sampling based on a clustering algorithm.

FIG. 19 shows an illustration of an exemplary statistical sampling based on a clustering algorithm. FIG. 20 shows a block diagram of an exemplary embodiment of statistical sampling based on a clustering algorithm with regard to FIG. 19.

In this approach, a feature vector is extracted from each trajectory, and a clustering algorithm is applied with predefined center(s) of clusters. Based on selection rate, a specific number of nearest-neighbor trajectories from each center of cluster may be selected.

Khalid, S. and Naftel, A. 2005. Classifying spatiotemporal object trajectories using unsupervised learning of basis function coefficients. In Proceedings of the Third ACM international Workshop on Video Surveillance & Amp; Sensor Networks (Hilton, Singapore, Nov. 11-11, 2005). VSSN '05. ACM, New York, N.Y., 45-52, (hereinafter Khalid) disclosed a method for clustering and classification of object trajectory-based video motion clips using spatiotemporal function approximation. Khalid noted that discrete point-based flow vector has been widely used for trajectory analysis by many researchers, but it results in high dimensionality and reduced system efficiency. Khalid tried to solve this problem by using a motion time series and a coefficient indexing scheme. A coefficient indexing scheme is an approach of using frequency domain coefficients of object trajectory time series derived from Discrete Fourier Transform (DFT). Khalid used the coefficients for clustering the trajectories by finding patterns of similar object motions and classifying anomaly detection.

Khalid is foreign to the idea of applying semantics-based and spatiotemporal criteria for the classification of trajectories, i.e., a spatiotemporal data. Khalid basically compared feature vectors from an average of training feature vectors using unsupervised clustering for classification. Khalid is foreign to the idea of video storage for selected video segments to reduce the size of stored data.

However, Khalid's approach can be used as one of the exemplary methods for spatial constraints in the frequency domain.

As an exemplary method of spatiotemporal constraints, the feature vector can be a DFT coefficient of trajectory time series as in Khalid. Time series of trajectory is considered as two independent 1-dimensional time series, $<t_i, x_i>$ and $<t_i, y_i>$. Khalid mapped time series of trajectory into frequency domain. It may reduce the dimension of feature for fast calculation by selecting dominant coefficients. The K-means clustering algorithm can be applied for grouping the feature of a trajectory. Finally, nearest neighbor trajectories from each center of cluster may be selected.

Another exemplary trajectory clustering can be found in Gaffney, S. and Smyth, P. 1999. Trajectory clustering with mixtures of regression models. In Proceedings of the Fifth ACM SIGKDD international Conference on Knowledge Discovery and Data Mining (San Diego, Calif., United States, Aug. 15-18, 1999). KDD '99. ACM, New York, N.Y., 63-72, (hereinafter Gaffney). Gaffney disclosed a model-based clustering algorithm for trajectories. Gaffney used a regression mixture model to represent the set of trajectories. Then, unsupervised learning is carried out using the maximum likelihood principle. Using this algorithm disclosed by Gaffney, clusters of trajectories can be calculated. Like Khalid, nearest-neighbor trajectories may be selected.

Utilizing the exemplary clustering approaches in the prior arts above, the trajectories may be selected based on the distance to each cluster's center feature of trajectory.

Figure 21:
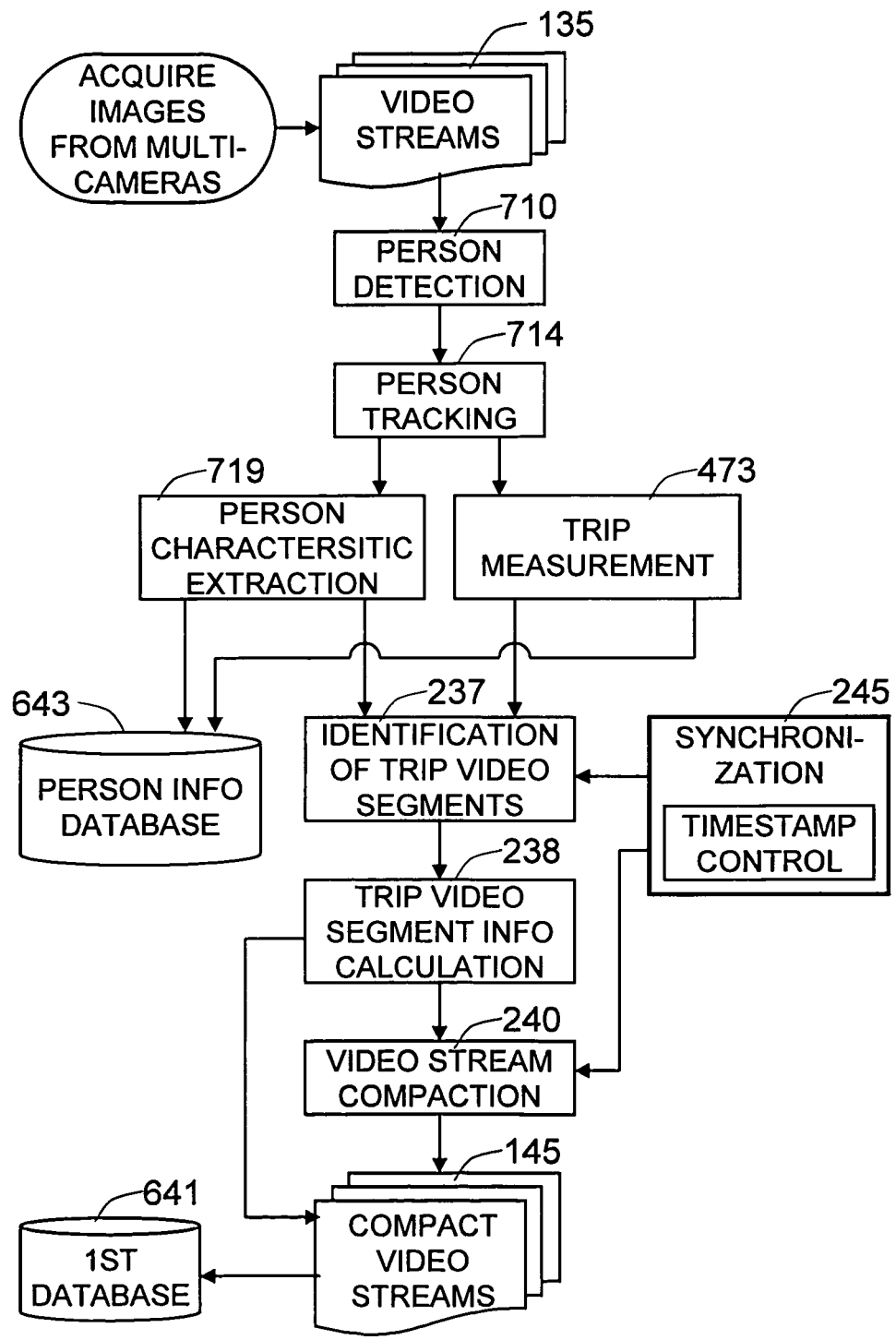
FIG. 21 shows exemplary processes of trip measurement, identification of trip video segments in each video stream, and video stream compaction in the present invention.

FIG. 21 shows exemplary processes of trip measurement, identification of trip video segments in each video stream, and video stream compaction in the present invention.

In the exemplary embodiment shown in FIG. 21, the present invention utilizes a plurality of means for capturing images 100, such as cameras, to track the people in an area of interest and capture multiple video streams 135. Using image processing algorithms, the present invention detects 710 and tracks 714 each person, such as a customer, in the video streams captured by the cameras.

With regard to person detection and tracking, the present invention can utilize any reliable video analytic tracking algorithms using multiple cameras that are known in the practiced art of computer vision research. For example, U.S. Pat. No. 8,098,888 of Mummareddy, et al. (hereinafter Mummareddy) disclosed a method and system for automatic analysis of the trips of people, using multiple cameras.

Based on the tracking information, the present invention performs the trip measurement 473 of the people. The track sequences of the people are augmented with additional information, which determines the values for the trip attributes at the trip measurement stage. The trip attributes comprise, but are not limited to, coordinates for the positions of the people, temporal attributes of the tracks, video stream ID, video segment ID, trip ID, and person ID for each of the people.

The plurality of trip measurements, such as person IDs, trip IDs, coordinates of track segments, and timestamps of the track segments, can be stored in a "trip information data structure," such as the linked list of pointers to the relevant video segments, where each node in the list contains trip information data elements.

In an exemplary embodiment of the present invention, the person IDs are also stored in a data structure for the people of interest, e.g., a table for person lookup, so that the person lookup table can be used to manage and find the information for the person of interest at the time of creating a logically-organized video for the particular person. The information for the person is stored in a "person information data structure", such as a person lookup table, that can reside in a person information database 643 in association with the "trip information data structure."

Based on the trip information, trip video segments in each video stream are identified 237, and each of the video streams is divided into two different sets of video segments—a first set of video segments that contains the trip information of the people, i.e., trip video segments, and a second set of video segments that do not contain the trip information of the people in each of the video streams.

In addition to distinguishing the trip video segments, the present invention also extracts characteristic information 719 for each person's tracking in the trip video segments. The characteristic information comprises the color and shape of the person. In addition, the present invention can also utilize demographic information as a way to identify the person. The demographic segment information includes age range, gender, and ethnicity.

The present invention can utilize any reliable demographic composition measurement method in the prior art for this process. For example, U.S. patent application Ser. No. 11/805,321 of Sharma, et al. (hereinafter Sharma Ser. No. 11/805,321) disclosed an exemplary demographic composition measurement based on gender and ethnicity.

The characteristic information is used to identify which track segment belongs to which person in coordination with the spatiotemporal information, such as coordinate sequences and timestamps of the track segments, when there are multiple track segments in a video segment during a window of time. For example, when a person's track segment appears in a video segment that has other track segments that belong to other people, the characteristic information is useful to help the module of "trip video segment information extraction" 241 in finding the correct track segment that belongs to the person.

After trip video segments in each video stream are identified 237 and each of the video streams is divided into two different sets of video segments, i.e., a set of trip video segments and a set of the other video segments, the present invention calculates the information for each of the trip video segments 238.

The information for each of the trip video segments is stored in a trip video segment information data structure that comprises a video stream ID, a video segment ID, a start frame number, and a finish frame number. The trip video segment information data structure is associated with the actual video segment data, and it can be stored in the same data storage for the compact video streams.

At the compaction process, based on the identification of the first set of video segments and the second set of video segments that do not contain the trip information of the people in each of the video streams, the present invention compacts each of the video streams by removing the second set of video segments from each of the video streams. This process results in compact video streams 145 that are composed of only the first set of video segments, i.e., trip video segments. The trip video segments are serialized in the compact video streams. The compact video streams 145 are saved in a data storage, e.g., "database 1" 641. The timestamps, starting frame, and ending frame of each of the trip video segments are also stored in a database for future reference. A lookup table for video segments can be used as an exemplary data structure that stores the information for each of the trip video segments. The processes are synchronized 245 with a time server, and the timestamps are measured.

Figure 22:
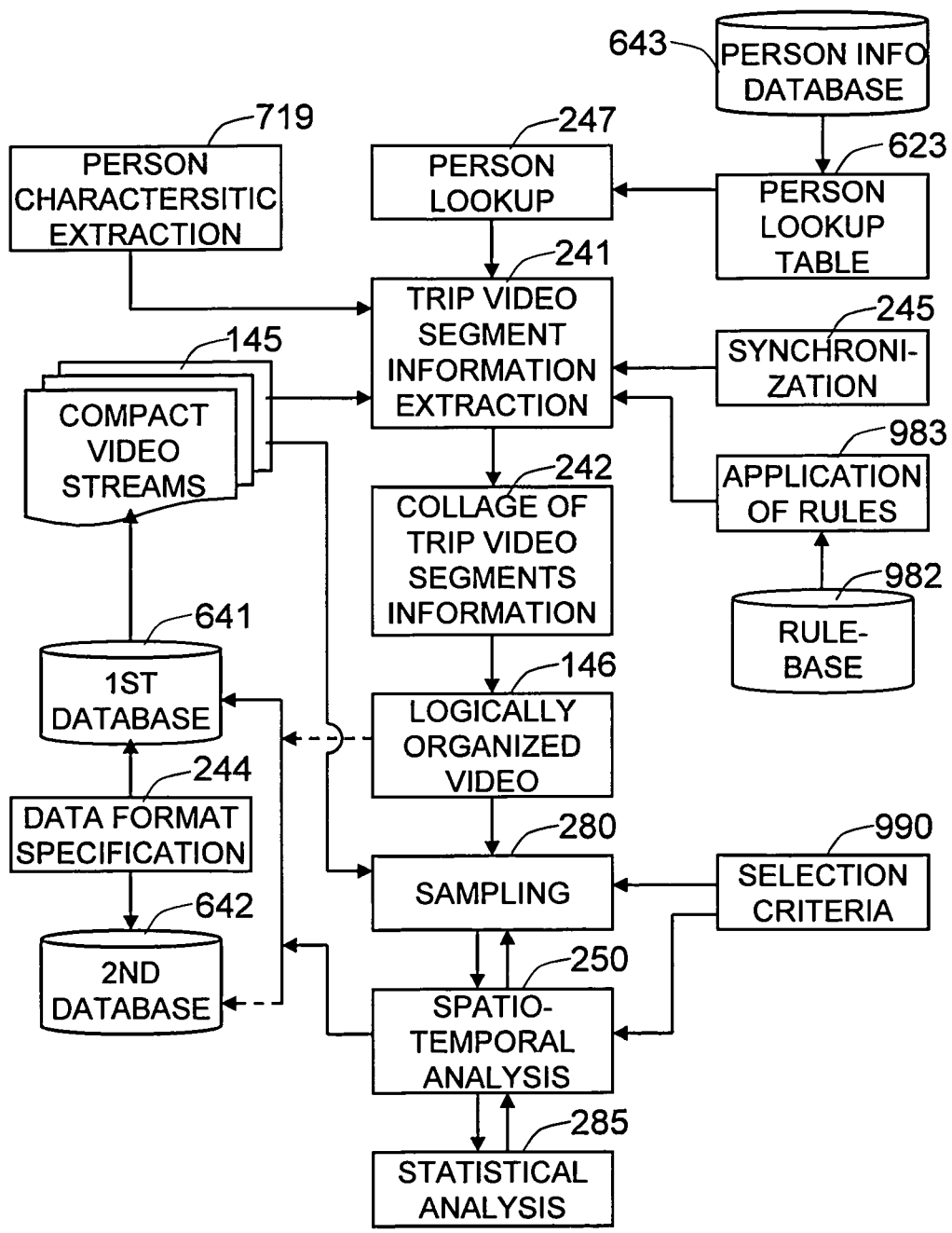
FIG. 22 shows exemplary processes of constructing logically-organized videos and the sampling of video segments based on selection criteria in the present invention.

FIG. 22 shows exemplary processes of constructing logically-organized videos and sampling of video segments based on selection criteria in the present invention.

When a person of interest is found 247 in a pool of persons, represented by an exemplary person lookup table 623 from a person information database 643, in relation to the person's tracking, a module for trip video segment information extraction 241 finds the relevant sequence of trip video segments in the compact video streams, and maps the person's ID and trip ID, along with the sequence of trip video segments. The mapping is aided by the person information in the person information database 243 in association with the trip information in a trip information data structure.

In this process, ambiguities caused by multiple appearances of the person in multiple video segments are also resolved. One exemplary algorithm for the resolution is to choose the earliest video segment where the person appears among the multiple conflicting video segments by comparing their timestamps.

Another exemplary algorithm is to choose a video segment that has the optimal view of the person tracking. The decision about whether a video segment has a better view of the person is made based on a set of predefined rules. For example, if the person's position in the video segment is located in a specific area or within a closer proximity to the specific area in the field of view, the video segment can be chosen as the optimal view video segment over others.

The present invention creates a collage of video segments information 242 according to the extracted trip video segments information per person.

The collage of video segments information is created and organized in a data structure 243. An exemplary data structure is a linked list of pointers, where the pointers point to the relevant video segments.

The output of the collage is essentially a logically-organized video for the specific person based on the person's trip information, in the sense that the references to the video segments can be logically-organized to fulfill a goal.

The logically-organized video 146 from the collage of video segments information 242 can be either 1) stored in a data storage or 2) sent to the sampling 280 process for the application of selection criteria 990.

When stored in a data storage, each of these logically-organized video streams for the people of interest is accumulated and further organized in a data format, i.e., a data structure construction of logically-organized videos 244. One exemplary data format structure can be a table of linked lists. In this table, each row entry contains a person's logically-organized video, i.e., a linked list of pointers to the relevant video segments for the person's trip among the compact video streams.

The present invention applies the predefined selection criteria to the video data from compact video streams or from the logically-organized video streams at the sampling 280 step. Exemplary sampling techniques on the video segments that contain track sequences achieve the storage savings in exemplary embodiments. Sampling criteria can be made very domain-specific, with the actual sampling being carried out in a different relevant domain space, such as shopper behavior for different demographics. Further, the present invention samples semantically-meaningful video segments from the compact video streams to produce a semantically-organized and further reduced-size collection of video segments.

The sampling 280 of the video segments from compact video streams or from the logically-organized video streams can be based on:
- spatiotemporal constraints for behavior,
- rule-based sampling approach,
- domain-specific sampling criteria, and
- semantics-based sampling criteria.

The rule-based sampling approach can comprise a rule application module. The rule application module can comprise information unit verification technologies. The rule can be a composite rule from multiple sub-rules in order to create more complicate selection criteria.

When applying the domain-specific sampling criteria, the actual sampling is carried out in the domain space. Therefore, the selection is performed in the domain space, not in the video space.

For the semantics-based sampling criteria, the semantics are formulated for behavior analysis in the video segments. The application of semantics facilitates intelligent sequencing of the video segments.

A spatiotemporal analysis 250 tests whether the sampled video segments meet the predefined spatiotemporal constraints for the selection. A statistical analysis 285 for the sampled data is performed to verify whether the sampled data meets the predefined statistical property. It also calculates and stores information that can be used as the basis for the statistical analysis of human behavior.

The final outputs of selected trip video segments, i.e., the reduced-size compact video streams, are stored in a data storage, such as in a first database 641. In another exemplary embodiment, the data can also be stored in a second database 642, after applying the next level of selection criteria to the already reduced-size video data once more.

The data storage for the data structure that contains the information of selected trip video segments can be the same as the data storage of the actual selected trip video segments, but the data structure can also be stored in a different data storage.

Along with the selected trip video segments, these data structures are part of the CORE format.

The stored trip video segments in the reduced-size compact video streams 145 can be retrieved at the later playback process, using the information in the data structures. For example, playback software can follow the pointers in the linked list and play the video segments in serial.

Rule Application Logic Module

The trip video segment information extraction process can be further facilitated by applying 983 a set of predefined rules in a rule base 982 through a rule application logic module. The rule application logic module can enable a dynamic rule application, rather than relying on an ad hoc solution or static hard code in extracting the video segments.

An exemplary rule application logic module can be implemented utilizing the information unit verification technologies in U.S. Pat. No. 7,904,477 of Jung, et al. (hereinafter Jung U.S. Pat. No. 7,904,477).

The rule application logic module enables the adjustment in the extraction to be done in a structured and dynamic way. The mapping of a video segment to the trip ID, person ID, and multiple appearance resolution can be dynamically adjusted based on the rule application logic module.

In an exemplary embodiment, the rule application logic module constructs an extraction criteria based on a set of predefined rules. The rule application logic module can further construct the criteria based on a combination of a set of predefined rules in which the extraction can be performed in further detail.

The application of the rule application logic module can differentiate the levels of extraction, where a first set of criteria is applied to all of the track segments in a video segment, and a second set of criteria is applied to a specific track segment. An exemplary first set of criteria can typically comprise common criteria throughout all of the track segments, and the second set of criteria is typically different from the first set of criteria.

Figure 23:
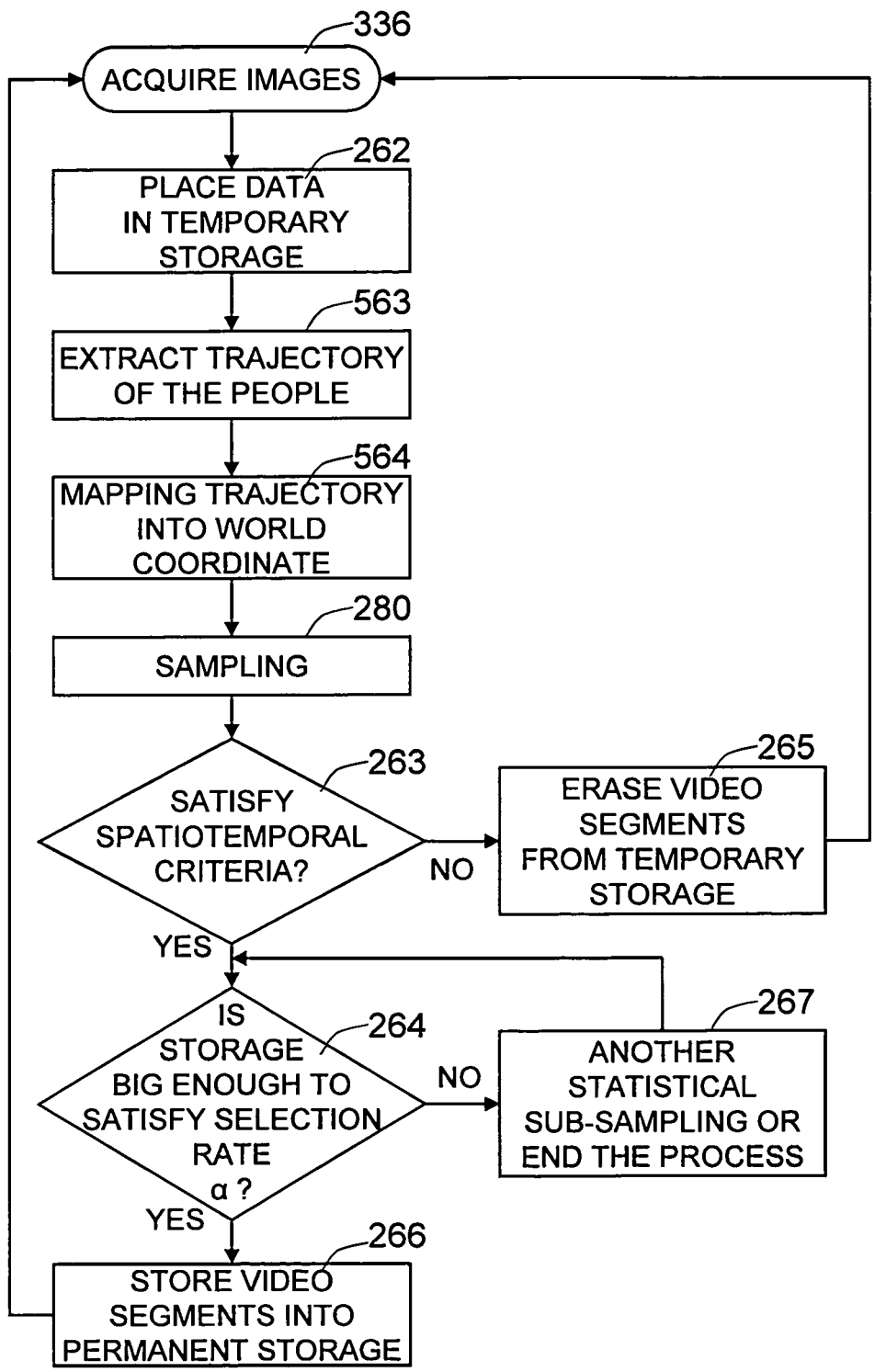
FIG. 23 shows an exemplary sampling process of video segments using spatiotemporal behavior constraints depending on the selection rate.

FIG. 23 shows an exemplary sampling process of video segments using spatiotemporal behavior constraints depending on the selection rate.

The present invention can comprise two-layered filtering steps for the video segments. In this exemplary process, after acquiring 336 images from the previous step, the present invention places the video data in a temporary storage 262, and extracts the trajectories of the people 563 in the video segments of input images. The trajectories are mapped to the world coordinates 564. The present invention applies the spatiotemporal constraints to the trajectories in order to sample 280 a subset of the video segments that contain satisfactory trajectories. If the trajectories that satisfy the spatiotemporal constraints are found, the present invention checks whether there is enough storage space 264 in the permanent storage to store the video segments that contain the filtered trajectories and whether the size of the increased data in the storage satisfies the selection rate. If there is enough storage space 264 in the permanent storage to satisfy the selection rate, the present invention stores the filtered/sampled video segments in the permanent storage 266, and then acquires new input images. If there is not enough storage space, the present invention processes another statistical sub-sampling 267 by applying further restrictive spatiotemporal constraints, or ends the process. If no trajectories are found that satisfy the spatiotemporal constraints at the temporary storage, the video segments are erased 265, and the present invention fetches new input video images.

Although the real-time sampling and storing of the sequence of pointers to video segments is not critically important in the present invention, the present invention can process the real-time sampling and storing of the sequence of pointers to video segments.

Figure 24:
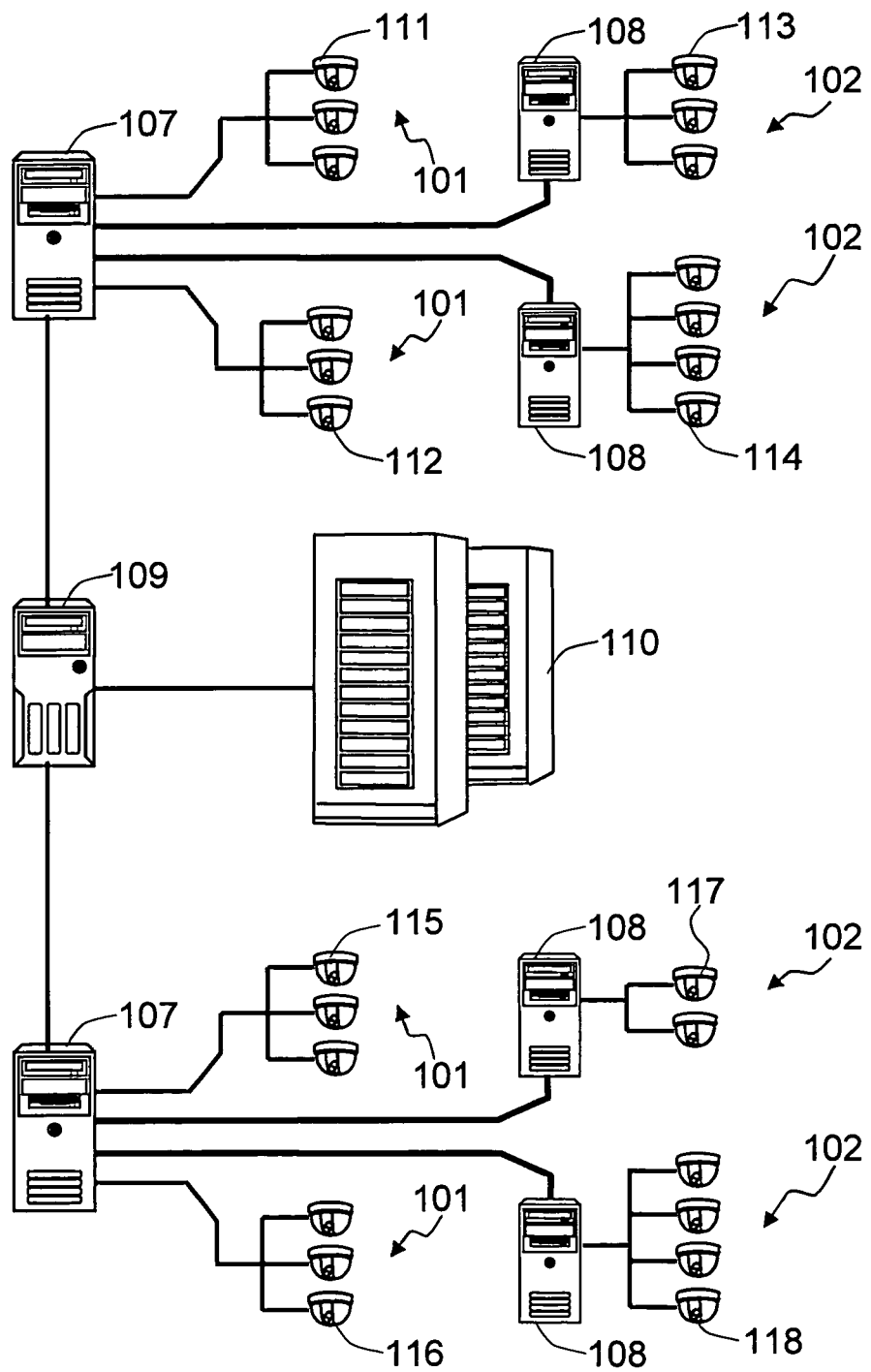
FIG. 24 shows an exemplary network of a plurality of means for control and processing and a plurality of means for capturing images that capture a plurality of video streams in the present invention.

FIG. 24 shows an exemplary network of a plurality of means for control and processing and a plurality of means for capturing images that capture a plurality of video streams in the present invention.

The network consists of a plurality of first means for control and processing 107 and a plurality of second means for control and processing 108, which communicate with each other to synchronize the timestamped lists of measurements among a plurality of video streams captured by the means for capturing images in the measured locations.

In the exemplary embodiment, a plurality of means for capturing images, i.e., a plurality of first means for capturing images 101, are connected to the means for video interface in a first means for control and processing 107.

If the distance between the plurality of means for capturing images is greater than a means for control and processing can handle, e.g., in order to cover the entire trip of a person in multiple areas, the plurality of means for capturing images can be connected to multiple means for video interface.

For example, in the exemplary embodiment shown in FIG. 24, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field of view can cover the traffic of the people in the measured location, and the second means for capturing images 102 can be installed near a location for the close view and detailed behavior analysis of the people. The means for capturing images are connected to the means for video interface through cables.

The digitized video data from the means for video interface is transferred to the means for control and processing that executes computer vision algorithms on the data. The means for control and processing can have internal means for storing data or external means for storing data 110.

The means for storing data 110 can be used to host the first database 641, the second database 642, and other data processed by the present invention.

The means for capturing images can comprise an analog camera, USB camera, or Firewire camera. The means for video interface, which can comprise a video frame grabber, USB interface, or Firewire interface, are typically included in the same enclosure as the means for control and processing. The means for control and processing can be a general purpose personal computer, such as a Pentium 4 PC, or a dedicated hardware that can carry out the required computation. The means for control and processing, as well as the means for video interface, can be placed locally or remotely, as long as the connection to the means for capturing images can be established. The internal means for storing data, such as internal hard disk drives, is placed within the same enclosure as the means for control and processing. The external means for storing data, such as a network storage driver or internal hard disk drives contained in a remote data storage server, can be placed locally or remotely, as long as a means for transferring data is available.

The present invention can generate timestamped measurements for the video streams and the video segments, in accordance with the behavior analysis, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The timestamped measurements facilitate the synchronization of the video data and the timestamp values in the data structures used in the present invention.

The number of means for capturing images per a means for control and processing varies, depending on the system configuration in the physical space. However, each means for control and processing knows the location and the identification of each of its associated plurality of means for capturing images and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for storing selected video segments for a person or a plurality of persons that visited an area covered by a plurality of means for capturing images using at least a computer that executes computer vision algorithms on a plurality of video streams, comprising the following steps of:
   a) finding information for the trip of the person or the plurality of persons based on track sequences calculated from tracking the person or the plurality of persons in video streams,
   b) determining a first set of video segments that contain the trip information of the person or the plurality of persons and a second set of video segments that do not contain the trip information of the person or the plurality of persons in each of the video streams,
   c) removing the second set of video segments from each of the video streams,
   d) selecting video segments from the first set of video segments based on predefined selection criteria, applying multi-layered spatiotemporal constraints to select the video segments, for the statistical behavior analysis
   e) applying domain-specific sampling criteria to the selection of video segments, and
   f) compacting each of the video streams using the first set of video segments, after removing the second set of video segments from each of the video streams, and
   whereby the application of the multi-layered spatiotemporal constraints further reduces the size of the selected video segments.

2. The method according to claim 1, wherein the method further comprises a step of selecting video segments from the compact video streams based on selection criteria, further reducing the size of video data.

3. The method according to claim 1, wherein the method further comprises a step of sampling the video segments based on the spatiotemporal constraints.

4. The method according to claim 1, wherein the method further comprises a step of sampling the video segments based on rule-based sampling criteria,
   wherein the rule-based sampling criteria comprise a rule application module, and
   whereby the rule application module comprises information unit verification technologies.

5. The method according to claim 1, wherein the method further comprises a step of applying semantics-based sampling criteria to the selection of video segments,
   wherein the semantics are formulated for behavior analysis in the video segments, and
   wherein the application facilitates intelligent sequencing of the video segments.

6. The method according to claim 1, wherein the method further comprises a step of analyzing the selected video segments based on demographics.

7. The method according to claim 1, wherein the method further comprises a step of creating a trip-centered format that stores the compacted video streams with the first set of video segments based on the track sequences from the plurality of means for capturing images.

8. The method according to claim 1, wherein the method further comprises a step of utilizing a format that comprises a data structure for associating the first set of video segments with the person or the plurality of persons based on the information for the trip of the person or the plurality of persons, including a table of indices, and
   whereby the format facilitates multiple applications dealing with behavior analysis and provides an efficient storage.

9. The method according to claim 1, wherein the method further comprises a step of resolving disambiguation among a plurality of video segments in the first set of video segments if the person or the plurality of persons are visible in more than one video segment in the first set of video segments during the same window of time in order to reduce duplicates of stored video segments.

10. The method according to claim 1, wherein the method further comprises a step of adjusting the selection criteria in association with a selection rate in order to maintain the size of the selected video segments stored in storage according to the selection rate.

11. An apparatus for storing selected video segments for a person or a plurality of persons that visited an area covered by a plurality of means for capturing images, comprising:
   a) a plurality of means for capturing images for capturing a plurality of video streams of the person or the plurality of persons in the area,
   b) at least a means for video interface that is connected to the plurality of means for capturing images,
   c) at least a computer that executes computer vision algorithms on the plurality of video streams, performing the following steps of:
   finding information for the trip of the person or the plurality of persons based on track sequences calculated from tracking the person or the plurality of persons in video streams,
   determining a first set of video segments that contain the trip information of the person or the plurality of persons and a second set of video segments that do not contain the trip information of the person or the plurality of persons in each of the video streams,
   removing the second set of video segments from each of the video streams,
   selecting video segments from the first set of video segments based on predefined selection criteria, applying multi-layered spatiotemporal constraints to select the video segments, for the statistical behavior analysis,
   applying domain-specific sampling criteria to the selection of video segments, and
   compacting each of the video streams using the first set of video segments, after removing the second set of video segments from each of the video streams.,
   d) at least a means for storing data that stores the selected video segments, and
   whereby the application of the multi-layered spatiotemporal constraints further reduces the size of the selected video segments.

12. The apparatus according to claim 11, wherein the apparatus further comprises a computer for selecting video segments from the compact video streams based on selection criteria, further reducing the size of video data.

13. The apparatus according to claim 11, wherein the apparatus further comprises a computer for sampling the video segments based on the spatiotemporal constraints.

14. The apparatus according to claim 11, wherein the apparatus further comprises a computer for sampling the video segments based on rule-based sampling criteria,
   wherein the rule-based sampling criteria comprise a rule application module, and
   whereby the rule application module comprises information unit verification technologies.

15. The apparatus according to claim 11, wherein the apparatus further comprises a computer for applying semantics-based sampling criteria to the selection of video segments,
   wherein the semantics are formulated for behavior analysis in the video segments, and
   wherein the application facilitates intelligent sequencing of the video segments.

16. The apparatus according to claim 11, wherein the apparatus further comprises a computer for analyzing the selected video segments based on demographics.

17. The apparatus according to claim 11, wherein the apparatus further comprises a computer for creating a trip-centered format that stores the compacted video streams with the first set of video segments based on the track sequences from the plurality of means for capturing images.

18. The apparatus according to claim 11, wherein the apparatus further comprises a computer for utilizing a format that comprises a data structure for associating the first set of video segments with the person or the plurality of persons based on the information for the trip of the person or the plurality of persons, including a table of indices, and whereby the format facilitates multiple applications dealing with behavior analysis and provides an efficient storage.

19. The apparatus according to claim 11, wherein the apparatus further comprises a computer for resolving disambiguation among a plurality of video segments in the first set of video segments if the person or the plurality of persons are visible in more than one video segment in the first set of video segments during the same window of time in order to reduce duplicates of stored video segments.

20. The apparatus according to claim 11, wherein the apparatus further comprises a computer for adjusting the selection criteria in association with a selection rate in order to maintain the size of the selected video segments stored in storage according to the selection rate.

* * * * *